Aug. 26, 1969  J. J. DA ROLD ET AL  3,463,919
AUTOMATIC BRAKING SYSTEM AND APPARATUS FOR USE THEREIN
Filed Jan. 5, 1967  6 Sheets-Sheet 1
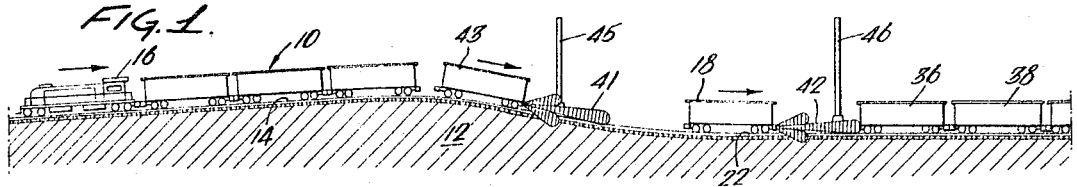
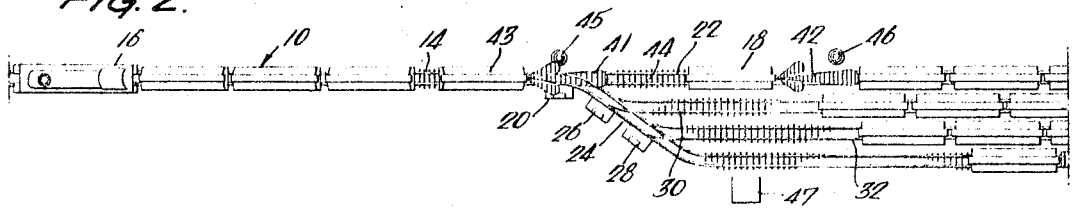
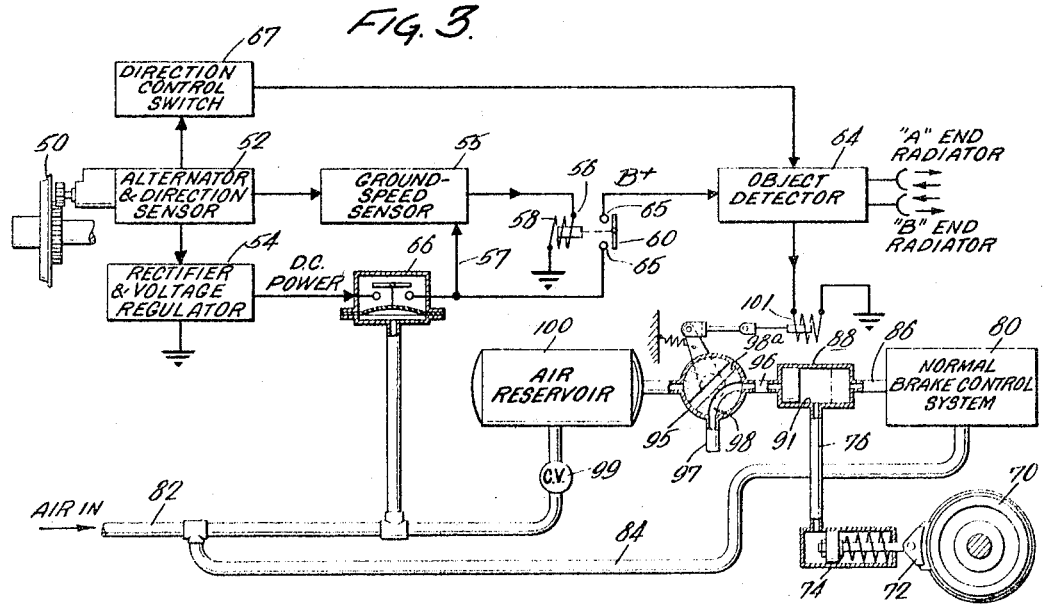
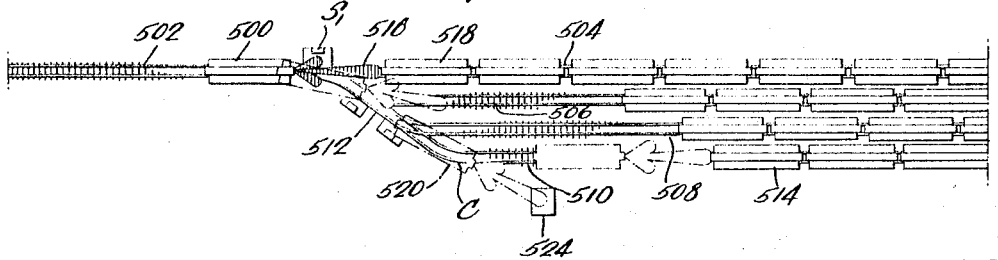
INVENTORS:
JAMES J. DaROLD
RUDOLPH F. TREVISIN
BY Howson & Howson
ATTYS.

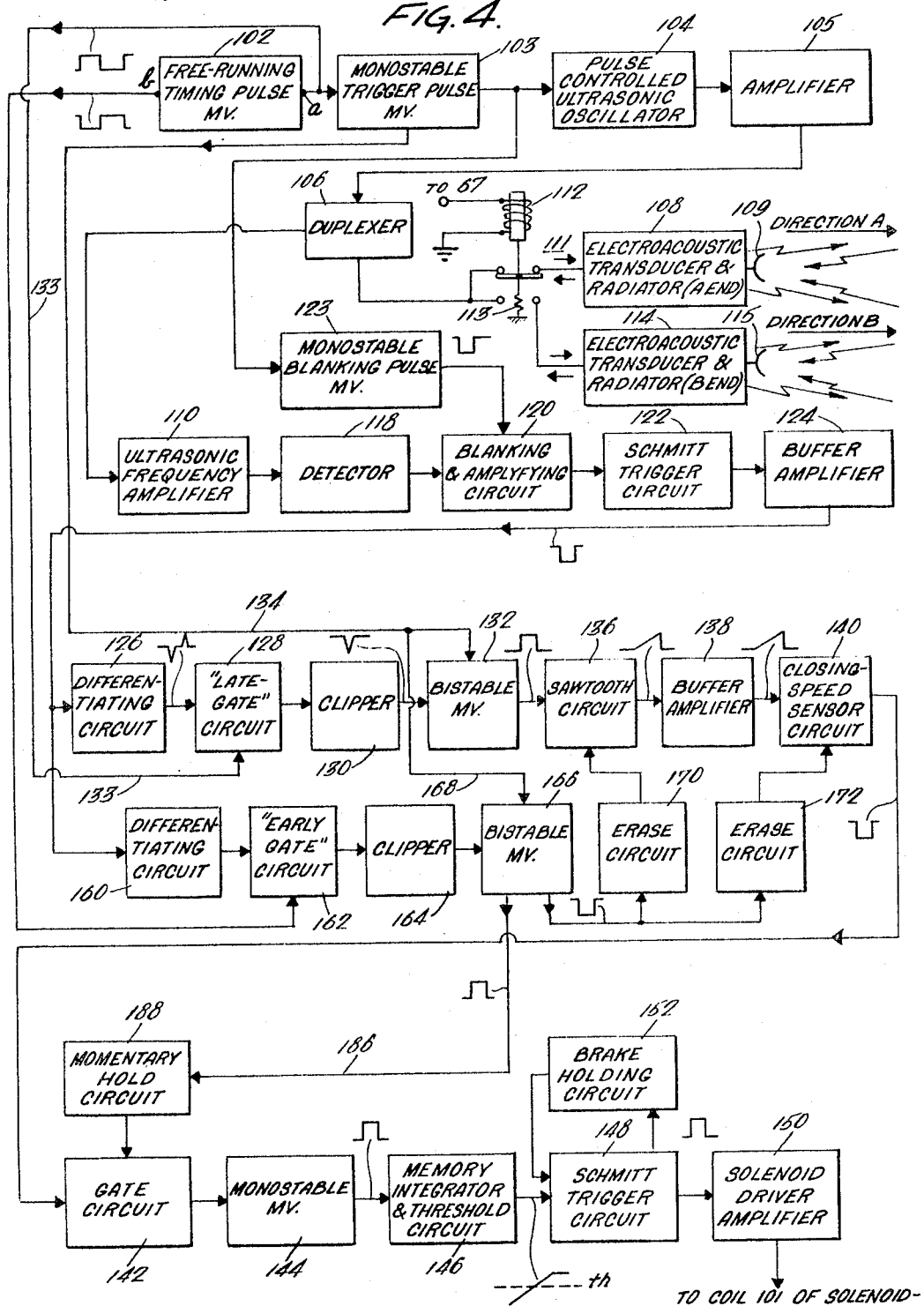

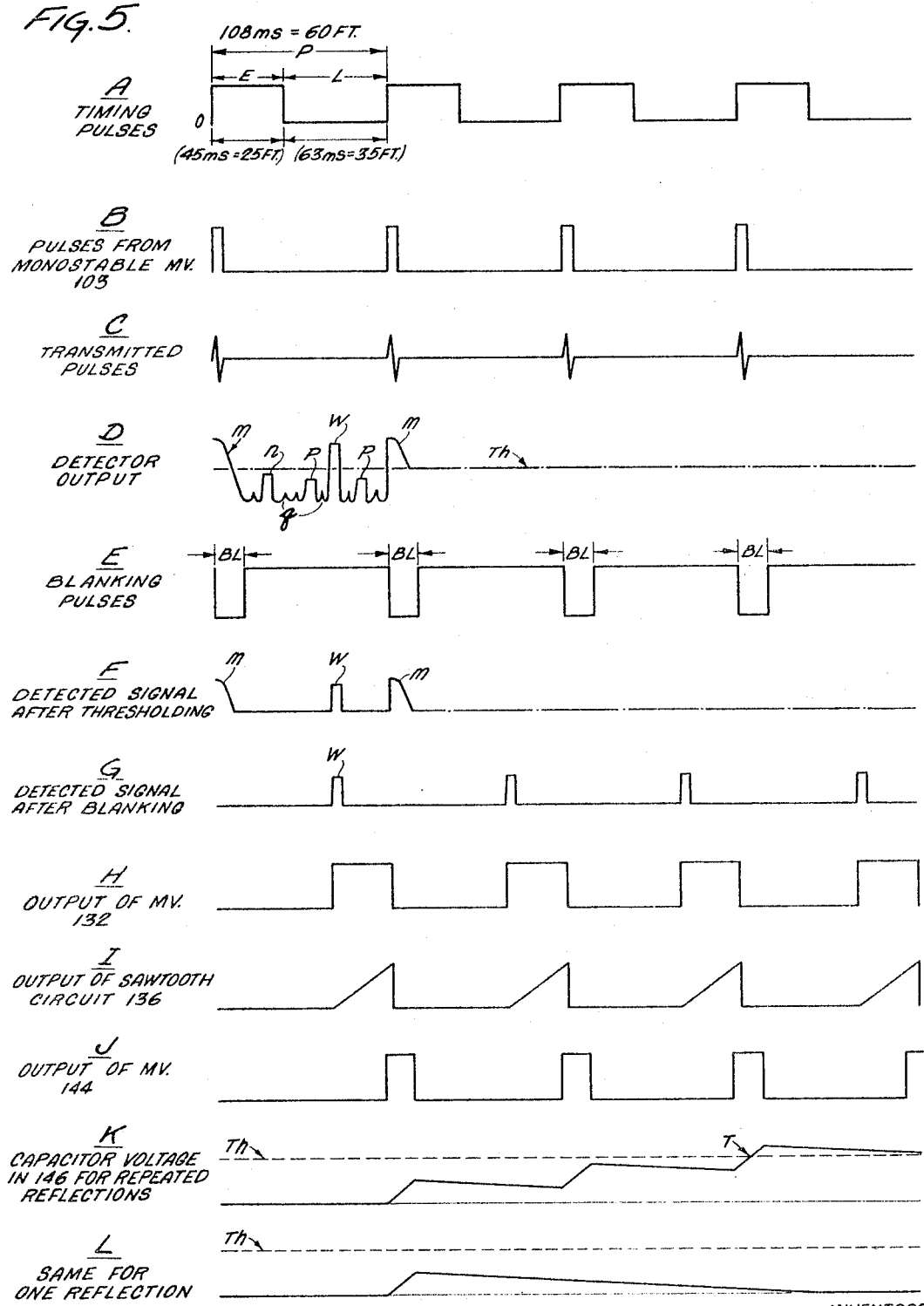

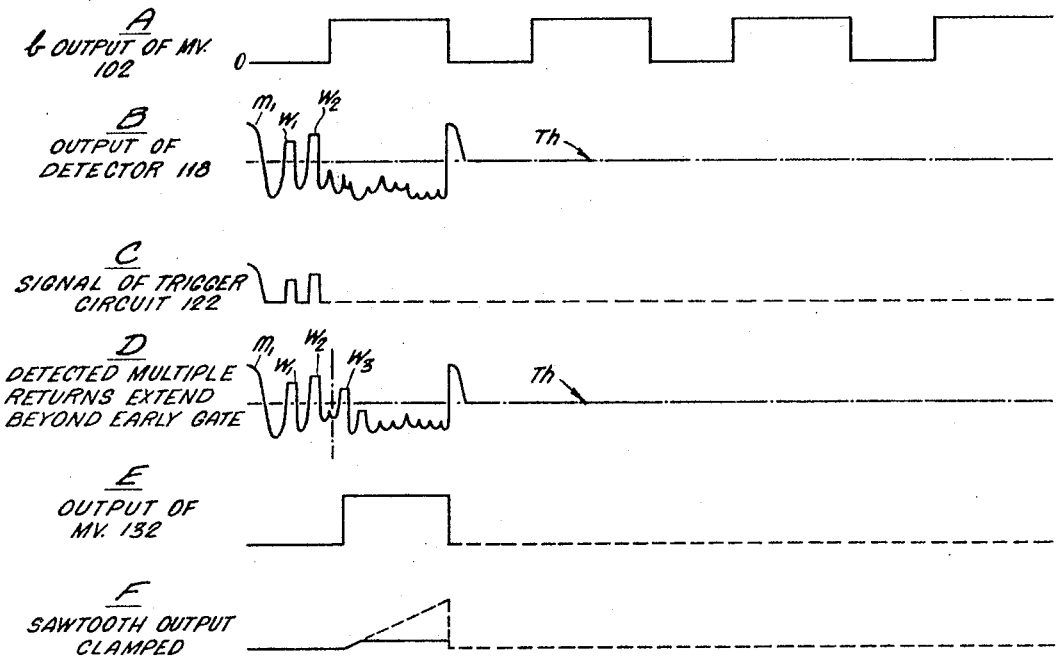
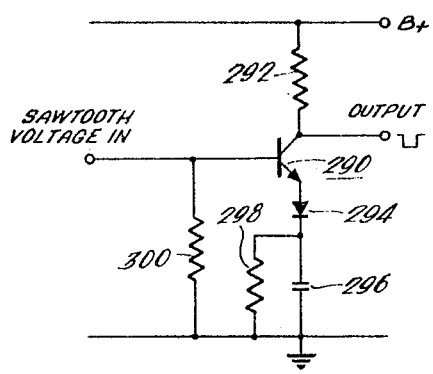
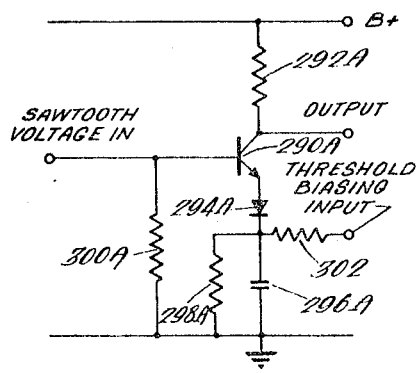
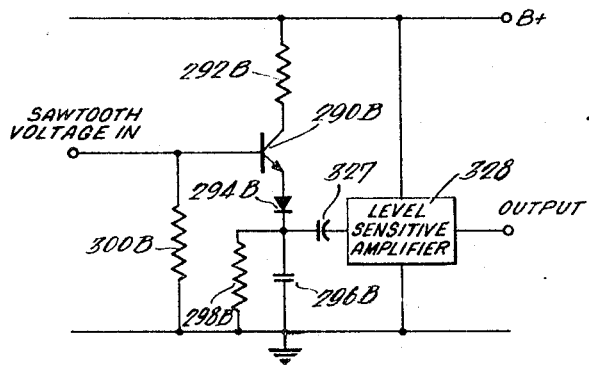

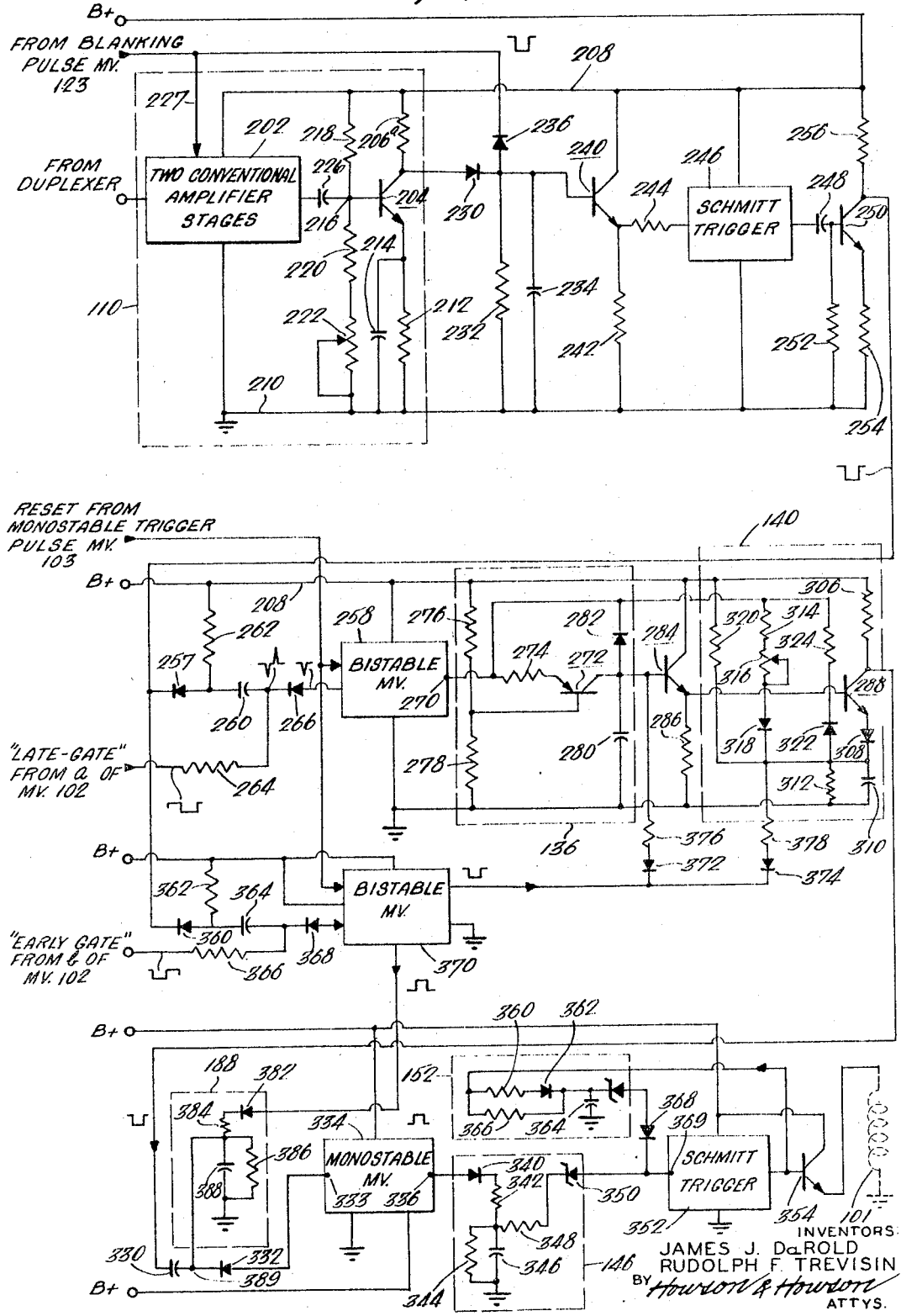

A "OPENING" TARGET

B CLOSING BELOW THRESHOLD SPEED

C CLOSING ABOVE THRESHOLD SPEED

D CONSTANT PULSE WIDTH FOR THRESHOLD BIASING OF CAPACITOR

E VARIABLE PULSE WIDTH FOR THRESHOLD BIASING OF CAPACITOR

United States Patent Office   3,463,919
Patented Aug. 26, 1969

3,463,919
AUTOMATIC BRAKING SYSTEM AND APPARATUS FOR USE THEREIN
James J. Da Rold, Huntington Station, and Rudolph F. Trevisin, Huntington, N.Y., assignors to AMBAC Industries, Incorporated, Columbus, Miss., a corporation of New York
Filed Jan. 5, 1967, Ser. No. 607,512
Int. Cl. B61l 3/00; B61b 1/00
U.S. Cl. 246—182                                    22 Claims

ABSTRACT OF THE DISCLOSURE

Automatic braking-control equipment is provided which is suitable for use in reducing the impact between railroad cars during car-sorting operations. A pulse-reflection type object-detector on the front of each car detects the car ahead when within a first predetermined distance of it and applies the brakes to bring the car to a slow speed for safe impacting. A closing-speed sensor utilizing a special capacity-charging circuit prevents initiation of braking during sorting unless the equipment-carrying car is approaching the car ahead at more than a predetermined closing speed. An "early gate" circuit prevents initiation of braking if the equipment-carrying car is within a second, smaller distance of a car ahead, as when the equipment-carrying car is part of a train. An integrating memory circuit is also preferably used to prevent braking in response to transient, spurious reflective objects.

Cross-reference to related applications

Portions of the apparatus described herein are described and/or claimed in copending application Ser. No. 529,081 of James J. DaRold and Rudolph F. Trevisin, filed Feb. 21, 1966, now Patent No. 3,370,166, and entitled "Object Detector and Control System Employing Same."

Background of the invention

This invention relates to apparatus suitable for use in detecting the presence of a remote object of a particular class and to systems employing such apparatus for control purposes, especially for controlling the automatic braking of vehicles. In its more particular forms it relates to object detectors and systems employing the same for providing automatic braking of a vehicle such as a railroad car when it approaches within a predetermined distance of another vehicle in front of it, so as to prevent unduly severe impacting of one vehicle against the other, for example during the assembling of freight trains by "humping" operations or the like.

Apparatus is known in the prior art for sensing the distance to objects by transmitting time-spaced pulses of energy toward the objects, receiving reflections of the pulses from the objects, and deriving indications of the times required for travel of the pulses to and from the objects. There are a number of significant drawbacks to many types of such systems when used in certain applications. For example, some such systems require complicated electrical circuitry for indicating the presence of target objects within a predetermined range. One relatively simple arrangement for providing an indication of object distance is to render the receiver sensitive only during a predetermined interval of limited duration following each pulse transmission, during which interval reflections are received only from objects within a predetermined corresponding range of distances; the occurrence of receiver output signals then indicates that an object is located within this predetermined range of distances.

However further problems arise in connection with such reflection-type object-detecting systems when it is desired that only particular types or classes of target objects produce indicating or control signals. Foh example, such a situation arises where it is desired to control the automatic braking of vehicles such as railroad cars. In the making-up of railroad trains it is common to give a railroad car on a feeder track an initial rolling velocity by pushing it over a hump or hill, or by giving it an initial push with a locomotive on a flat track, after which it is to roll freely to a ladder track and thence to a particular branch track as controlled by the operation of appropriate switches in a switchyard. If the car is given sufficient initial velocity to assure that it will roll far enough onto the desired branch track, unduly severe impacts commonly occur between the rolling car and an immediately-preceding stationary car already on the branch track, this effect being particularly difficult to avoid because of unavoidable differences in the rolling velocities of the cars and in the distances which they travel before impact. Apparatus would therefore be desirable which would automatically apply the brakes of the rolling car when it approaches to within a predetermined range of distances from the car next ahead of it against which it is to impact, so as to slow the rolling car to a speed for which only mild impact will occur, at which point the brakes would be released by a suitable ground-speed sensor on the rolling car to permit the latter car to roll gently against the car ahead.

In such systems it would also be desirable that the apparatus employed to control braking be capable of responding quickly to the presence in front of it of the car against which it is to be impacted, but it is also important in many cases that the system be substantially immune to actuation by the presence of other reflective objects along its path such as railroad ties, track-side structures, switching equipment, or a railroad car other than that against which the rolling car is to be impacted which may momentarily occupy a position generally in front of the rolling car as it maneuvers and turns in travel to its destination. It is also important in certain applications to prevent initiation of automatic braking when the equipment-carrying car is in a train line, and also when a car ahead of it is in the range for which the brakes are usually automatically applied but is moving away or, in some cases, is being approached but at less than a predetermined rate of closing speed. The detailed natures of these and other effects which can interfere with the desired operation in specific applications of the invention are described fully hereinafter. Similar or analogous problems arise in other systems to which the invention is applicable.

The above-mentioned copending application Ser. No. 529,081 describes and claims a system which is effective to provide a number of the foregoing types of immunity from undesired actuation of the brakes. However, it does not provide the desired immunity from actuation by a railroad car immediately ahead of it when connected in a train line, or by a railroad car ahead of it but moving away from it or being overtaken at less than a predetermined minimum rate. Accordingly, the system of application Ser. No. 529,081 is satisfactory if manually or mechanically turned off when the equipment-carrying car is connected in a train, and if manually or mechanically turned on during sorting only after the car ahead has rolled well beyond the maximum range of the object-detecting equipment; however, the system itself is not completely automatic in these respects.

More particularly, it has been found that when a car carrying such an object-detector is in a train line, reflections of transmitted pulses may be received at times delayed with respect to the times of pulse transmission by amounts corresponding to the ranges for which the object detector is normally sensitive, and for which it normally will produce braking. Such reflections are often due to multiple-trip reflections of pulses from a car ahead, which return to and are reflected from the equipment-carrying car and then re-reflected from a car ahead, so as too return again and be received at a later time when the object detector is normally sensitive. As a result, if the car is in a train being pushed by an engine preparatory to sorting, with its object detector turned on, it may cause undesired operation of the car brakes at such time.

Also, when one car has just left the sorting train in its rolling travel toward its destination, and the following car is being pushed preparatory to start of its trip, the spacing between the cars may open to the distance for which the object detector on the second car is sensitive so that the brakes of the second car are automatically applied, undesirably. Furthermore, during a given sorting operation the following car may be rolling somewhat faster than the car ahead so that it catches up to within the sensitive range of its object detector for which the brakes are normally applied automatically; if the following car is thus closing with the one ahead but only at a low speed less than a predetermined minimum, it is often preferred not to actuate the brakes of the following car.

Summary of the invention

Accordingly it is an object of the invention to provide new and useful apparatus for sensing the presence of remote objetcs within a predeterimned range of distances.

Another object is to provide such apparatus which is capable of producing control signals selectively in response to the presence of remote objetcs of a particular class or type.

Another object is to provide new and useful apparatus and a system employing same, which is simple and reliable in operation.

A further object is to provide a new and useful apparatus and system for providing automatic braking of a vehicle carrying the apparatus when the apparatus-carrying vehicle is within a predetermined range of distances from another vehicle in its path.

Another object is to provide such an apparatus and system suitable for mounting on one end of a railroad car and opeartive to brake said car when said car has approached to within a predetermined distance of the car ahead of it on the same track.

Another object is to provide new and useful apparatus for assuring that braking of a vehicle carrying the apparatus will not be initiated when said car is within still another, smaller, predetermined distance of the car ahead of it on the same track, as when attached in a train line.

Still another object is to provide an apparatus for permiting initiation of automatic braking of a vehicle carrying the apparatus only when the apparatus-carrying vehicle has at least a predetermined positive rate of closure relative to the car ahead of it.

Another object is to provide a new and useful circuit for sensing rate of closure in response to reflections from objects, and to provide a new and useful circuit for sensing the rate of change of amplitude of time-spaced pulsiform signals.

It is also an object to provide an automatic braking system which is reliable to produce continued braking only in response to a car or smaller reflective object on the same track despite the presence, along or adjacent the track, of other reflective objects producing reflections tending to interfere with the desired braking operation, and which is operative to prevent initiation of automatic braking if an equipment-carrying car is not closing with a car ahead or is within a predetermined short distance from a car ahead.

These and other objects of the invention are achieved as follows. A system is provided which utilizes an object detector comprising pulse-echo object-detection apparatus for transmitting pulses and receiving reflections thereof from remote objects when the apparatus-carrying car is moving at a ground speed in excess of a predetermined speed such as four miles per hour. The receiving arrangement preferably includes blanking means for rendering the receiver insensitive during blanking intervals immediately following each transmitted pulse to eliminate the effects of transmitter pulse leakage, transducer "ringing" and reflections from nearby objects within a predetermined distance shorter than the distance for which return target signals are desired. This prevents undesired operation of the system in response to reflections from such nearby objects, including relatively small objects which, because they are so close to the pulse echo system, tend to produce strong spurious signals at the receiver; to further protect against undesired signals from close-in objects, time-varying gain (TVG) is preferably incorporated which requires closer targets to return significantly larger return echoes than the more distant targets in order to pass through the receiver to the logic circuitry.

Two "listening" periods are employed following each transmitted pulse; both occur later than the blanked time interval immediately following the transmitted pulse. Target reflections received in the first listening period ("early gate") produce control signals which prevent initiation of automatic braking even if reflections are received in the second, later listening period; this insures that the system will not produce braking when tied in a moving train line. Target reflections received in the second listening period ("late gate") will activate the target circuitry unless prevented from doing so by reception of target reflections during the "early gate" interval.

Also employed is circuitry that discriminates among reflections received from target objects toward which the equipment-carrying car is closing at a speed in excess of a predetermined minimum and reflections from other target objects with respect to which it is closing at less than said predetermined speed or is receding. Hence even if a target object is present only in the second listening period, the apparatus-carrying car must be "closing in" on the target object at a speed exceeding a fixed minimum rate in order to permit initiation of automatic braking action. All other types of targets are effectively rejected, thereby enabling the car equipped with the system to prevent undesired application of brakes during car maneuvering in which there is no real danger of imminent severe impact against a car ahead.

Further, as in the system described in the above-cited application, the preferred form of the invention also employs integrating means which respond to received signals after performance thereon of the above-mentioned logic functions, to produce a brake-control signal only in response to target reflections which not only meet the requirements discussed above but which also persist over the time of a predetermined plurality of transmitted pulses. This militates against undesired operation of the brakes in response to reflections from objects in the "late gate" range which may be small compared with the object to be detected, but which are nevertheless capable of producing unusually strong reflections in response to one or a small number of transmitted pulses when at a specific ciritcal angle with respect to the transmitter; this critical angle may occur momentarily during motion of the pulse-echo system.

In addition, as in the system described in the above-cited application, there is preferably employed a holding circuit which responds to the brake-control signal produced by the integrating means and, once the brake-control signal has persistted for a predetermined time, causes it to persist thereafter even if output from the integrating means disappears. This arrangement permits the system to produce a brake-control signal quickly in response to the presence of a desired target object in the preselected range, so that the brakes can be operated promptly, and enables the brake-control signal to continue even after the distance to the target object decreases to within the "early gate" and blanking gate regions whereby enough time to accomplish the desired amount of braking is provided. However, if the brake-control signal was initially produced in response to an undesired object such as a track-side structure or a car on another track which is only momentarily in a position to sauce reflections large enough to produce a brake-control signal, the holding circuit will not be operated and the brake-control signal and the braking operation will occur only momentarily and will be discontinued promptly when continued relative motion between the vehicle and the object causes the reflections to become weaker and the output signals from the integrating means to disappear.

Preferably also the system includes a threshold circuit for removing all receiver output signal substantially smaller than those which the desired target object will produce when within the desired detection range, and a pulse-forming circuit which supplies, at most, a single pulse of predetermined electrical energy to the integrating means for each transmitted pulse, thereby increasing the reliability of the system and especially of the integrating means, as in the system of said copending application.

More particularly, in a preferred form of the invention an ultrasonic pulse-echo object-detecting system is mounted on a railroad car which is to be rolled along a track having one or more switches to permit diversion of the rolling car to a particular branch track on which the train of which it is to be a part is to be assembled. The antenna pattern of the object-detecting system is directed forwardly of the car. When the rolling car approaches to within a predetermined distance $D_{max}$, such as 60 feet, from a car already on the same branch track and has at least a predetermined minimum ground speed (e.g. four m.p.h.) the object-detecting system produces a control signal to apply the brakes so as to slow the rolling car to a safe speed for impacting against the car ahead; the brakes are held on by the holding circuit until, when the car has been braked to this safe speed, the ground-speed sensor on the rolling car releases the brakes. Signals received correspoinding to objects in the blanking region (e.g. 0–10 feet) and the "early gate" region (e.g. 10–25 feet) are prevented from initiating application of the vehicle brakes at any time. Furthermore, signals received during the "early gate" interval are used to prevent initiation of braking at such times even if target signals are received during the "late gate" interval (corresponding to 25–60 feet).

Hence if the car is later moving in a train at more than said minimum ground speed, its brakes will not be automatically applied under any circumstances. Furthermore, if the car ahead of the equipment-carrying car is within "late-gate" range during sorting maneuvers, but is not being approached at more than a predetermined relative speed (e.g., three m.p.h.), the brakes of the equipment-carrying car are prevented from being applied by the automatic equipment due to the operation of the closing-speed sensor. Interfering reflections of low strength received after the blanking and "early-gate" intervals and before the next transmitted pulse are eliminated by a threshold circuit, and those which exceed the threshold level for only one or very few successive pulses are prevented from operating the brakes by an integrating circuit which produces a control signal to operate the brakes only after reflections greater than the threshold level have been received in response to a plurality of immediately-successive transmitted pulses, e.g., three. Any interfering reflections which may recur sufficiently often to cause the integrating circuit to produce a brake-control signal will nevertheless persist for only a relatively short time, e.g. a small fraction of a second, and when they disappear will release the brakes promptly. However, reflections from the car on the branch track against which the equipment-carrying car is to be impacted will recur for a time sufficient to operate a holding circuit, which holds the brakes on thereafter even when the integrator output ceases, so that, when the rolling car approaches to within the "early gate" and blanking distances from the car ahead, the brakes will nevertheless continue to be applied to slow the car to the desired low final speed.

A novel form of closing-speed sensor is preferably used in the above-described system. It employs capacitive means chargeable by way of a unilaterally-conductive device, together with means for sensing the occurrence of charging of the capacitive means. Target reflections are used to derive pulses, preferably of sawtooth form, having a peak amplitude which increases with decreasing target range and vice versa. These pulses are applied to the unilaterally-conductive device and capacitive means so that any given pulse charges the capacitive means only if its peak voltage exceeds that already on the capacitive means. If no other source of charging is provided for the capacitive means, only the first few applied pulses charge the capacitive means if the pulses are of decreasing amplitude, corresponding to an increasing target range; if the pulses are increasing in amplitude, corresponding to a closing target object, each pulse produces charging of the capacitive means and such repetitive charging is sensed and used to activate the later brake-control circuitry.

In a preferred form of the closing-speed sensor, reflections from target objects are rejected even though the range to them is decreasing, unless the closing rate exceeds a predetermined threshold rate. This is accomplished by charging the capacitor means, directly and independently of the unilaterally-conductive device, at a predetermined rate, so that charging of the capacitive means by the reflection-produced variable-amplitude sawteeth can only occur if the peak amplitudes of successive sawteeth increase at a rate greater than the direct, independently-produced rate of increase of voltage on the capacitive means, and hence only if the closing rate exceeds a predetermined threshold rate.

The "early-gate" arrangement referred to above provides two further operations. First, it operates a momentary-hold circuit for effectively eliminating the above-mentioned first few output pulses from the closing-speed sensor which occur in response to reflections from targets moving away from the equipment-carrying car. In addition, if "stale echo" reflections of one transmitted pulse are received in the "late-gate" interval following the next transmitted pulse, as may occasionally occur, such reflections, even though incapable of actuating the output of the closing-speed sensor, may result in substantial charging of the capacitive means therein, which in some cases would interfere with the latter proper operation of the closing-speed sensor. However, before such desired later operation of the closing-speed sensor, the "stale echo" reflections will be received by the "early-gate" system and used to erase or remove the undesired charge on the capacitive means to enable the closing-speed sensor to perform properly thereafter.

It will be understood that while in the preferred arrangement both the "early-gate" arrangement and the closing-speed sensor are utilized, preferably in combination with the thresholding, integrating, and holding circuitry for rejecting spurious reflections, either the "early-gate" arrangement or the closing-speed sensor may advantageously be used alone in certain applications; and that the preferred form of closing-speed sensor itself is new and useful even for entirely different purposes than are specifically described herein.

Brief description of the drawings

These and other objects and features of the invention will be more readily understood from a consideration of the following description, taken in connection with the accompanying drawings, in which:

FIGURES 1 and 2 are schematic side and plan views, respectively, to which reference will be made in explaining the application of the invention to railroad-car sorting operations;

FIGURE 3 is a schematic diagram of a brake-control system to which the present invention is applicable;

FIGURE 4 is a block diagram of a preferred embodiment of apparatus in accordance with the invention;

FIGURE 5 is a graphical representation illustrating certain electrical waveforms produced in the normal operation of the invention in one of its forms during railroad-car sorting;

FIGURE 6 is a graphical representation illustrating certain electrical waveforms producible by the apparatus of the invention while in operation in a "train line";

FIGURE 7 is an electrical circuit diagram, partly in block form, of a preferred embodiment of the invention;

FIGURES 8, 9 and 10 are electrical schematic diagrams illustrating three different embodiments of closing-speed sensor in accordance with one feature of the invention;

FIGURE 14 is a schematic plan view of a railroad car and track system to which reference will be made in explaining how certain other types of interfering signals may arise.

Description of the preferred embodiments

Figure 11:
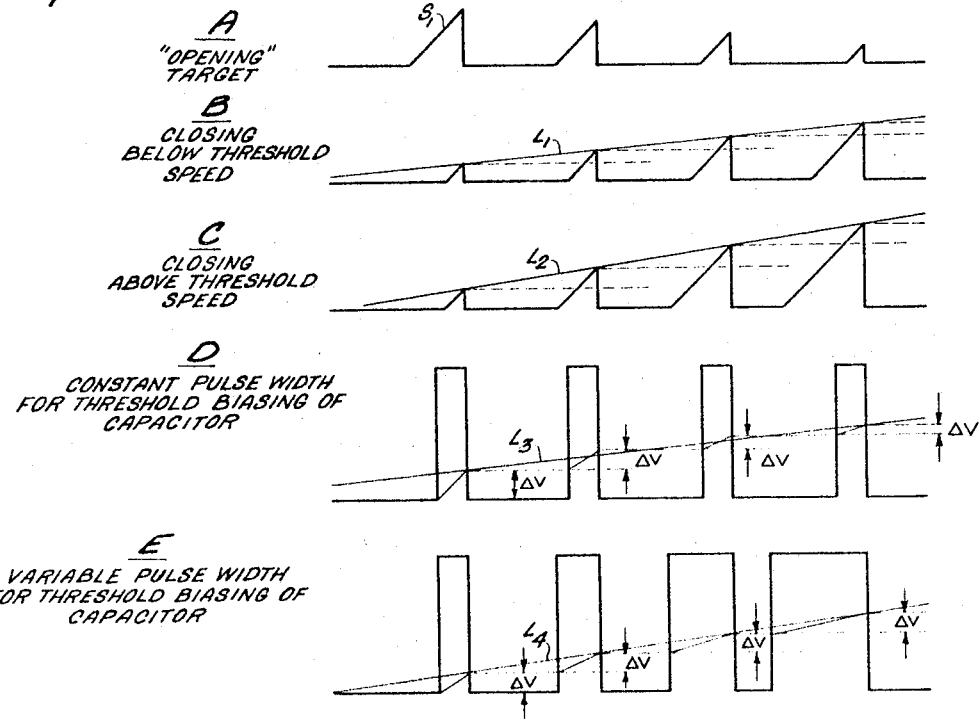
FIGURE 11 is a graphical representation to which reference will be made in explaining operation of the closing-speed sensor.

The invention will be described with particular reference to use in a railroad car humping system such as is represented schematically in FIGURES 1 and 2. A train of railroad cars 10 is pushed up a hill or hump 12 in the feeder track 14 by a switching locomotive 16, generally at a very slow rate such as less than four miles per hour, each car in the train reaching the crest of the hill and rolling down the other side through one or more switches in a particular branch track. For example car 18 may roll freely through a switch 20 to a branch track 22. As shown in FIGURE 2, the feeder track 14 in which the hump 12 is formed typically communicates with an oblique ladder track 24, which, in addition to switch 20, may include a plurality of other switches such as 26 and 28 feeding other branch tracks such as 30 and 32, respectively, for example. In this way the desired train of cars can be assembled on the branch tracks by rolling the cars from the feder track separately down the slope of the hump and switching each car to its appropriate branch track.

As indicated in FIGURE 1, in general when any individual car such as 18 is caused to roll freely onto its appropriate branch track there will be one or more other stationary cars such as 36 and 38 already on the same branch track. It is intended that each newly-arriving car on a branch track impact the one immediately ahead of it so that the cars will couple together, but, in view of unavoidable differences in the rolling velocities of different cars reaching the branch tracks as well as the different positions of the stationary cars on the various branch tracks, in previously existing systems the impact between the rolling car and the fixed or stationary car has often been unduly severe, resulting in potential damage to the cars and their contents. On the other hand, if the velocity of the rolling cars is too small they may not reach their destination, or may do so at such a slow speed as not to couple properly to the preceding car.

In the system now to be described each rolling car is given sufficient initial velocity to assure that, if it is allowed to roll freely throughout its travel or is braked only momentarily, it will reach its destination with more than sufficient velocity. When it has moved to within a predetermined distance of the stationary car against which it is to impact, an object-detecting pulse-echo system mounted on the front of the rolling car detects the presence of the stationary car and applies the brakes of the rolling car until the latter car slows down to a predetermined optimum speed for impacting, after which it rolls into contact with the preceding car with substantially the optimum relatively-low velocity. The curves 41 and 42 in FIGURES 1 and 2 represent the radiation patterns of the object-detecting systems on cars 43 and 18, respectively. Reflections which tend to interfere with the desired automatic operation of the brakes may be produced by railroad ties such as 44, utility poles such as 45 and 46 and buildings such as 47 disposed along or adjacent the tracks.

FIGURE 3 illustrates an overall automatic braking system to which the invention is applicable. The equipment shown in FIGURE 3 is mounted on each of the railroad cars to be distributed to the various branch tracks, an ultrasonic radiator being positioned low on each end of the car. One of the car wheels 50 is mechanically coupled to drive an alternator and direction sensor 52 the electrical power output of which in the form of alternating current is passed through a conventional rectifier and voltage regulator 54 to produce DC power for operating the electrical portions of the system. Another output of the alternator and direction sensor 52 is supplied to a ground-speed sensor 55, which produces a DC output to operate single-pole, single-throw relay 56 when the speed of the railroad car relative to the ground rises above a predetermined minimum value $V_{min}$, such as four miles per hour for example. Various conventional forms for such ground-speed sensors are known, which may operate upon the frequency of the alternator output or the magnitude of the alternator voltage, or on a combination of both. In the present example, the ground-speed sensor is operative only when provided with operating DC supply power by way of DC supply lead 57. The contacts of relay 56 are normally open, but are closed by the direct current supplied to coil 58 thereof from ground-speed sensor 55 when the ground speed exceeds $V_{min}$. Preferably, the sensor 55 and relay 56 are such that "drop-out" of the relay, i.e., re-opening of its contacts, occurs at a velocity $V'_{min}$ slightly less than $V_{min}$, e.g. at three miles per hour.

Closing of the pole 60 of relay 56 to its contacts 65 causes DC power from rectifier and voltage regulator 54 to be supplied to an object detector 64, provided that pressure switch 66 is also then closed. The latter pressure switch is open in response to pneumatic pressure supplied thereto from the usual pneumatic train pipe so long as the railroad car is coupled in a train having the customary pressurized brake line. However when the car is decoupled from the train, as when it is to begin its free roll during the humping operation, the contacts of pressure switch 66 close and, when the speed of the rolling car then increases to above $V_{min}$, DCC power will be supplied to the object detector 64 to render it operative. Whenever the speed of the carr falls below $V'_{min}$ the object detector 64 is again rendered inoperative.

A direction control switch 67 is controlled by the direction sensor output of alternator and direction sensor 52 and in turn controls the object detector so it will only radiate ultrasonic energy from the parabolic reflector located at the forward end of the car, i.e., at the "A" end or at the "B" end of the car depending on the direction of forward motion of the car. Conventional apparatus for sensing the direction of rotation of the car wheels and for operating the switch 67 to one or the other of two positions thereof may be employed; the manner of switching between "A" and "B" radiators will be set forth later herein.

The car wheel 70 represents one wheel of the railroad car to which controlled braking is to be applied. For this purpose there is provided the usual brake shoe 72 and brake cylinder 74 for urging the shoe against the wheel when pressure is supplied to the brake cylinder by way of pressure line 76. In order to provide normal operation of the brakes when the car is part of the coupled train there is provided a normal brake control system 80 such as is commonly provided on railroad cars, which is supplied with operating pressure from the usual train pipe 82 which in turn is pressurized only when the car is coupled to others so as to complete the connection to the pressure source in the train engine. When pressure from train pipe 82 is so supplied to inlet line 84 of the normal brake control system 80, the latter system produces no output pressure at its outlet line 86; however when pressure at line 82 is reduced or disappears as when the car in question is decoupled from the train, system 80 operates to apply pressure developed at its outlet line 86 to brake cylinder pressure line 76, in the present case by way of a pressure valve 88.

Pressure valve 88 comprises a pressure-sealing piston 90 which is readily slidable longitudinally in cylinder 91. Piston 90 occupies its extreme left position, as shown in full line, when its right face is at a positive pressure with respect to its left face, and under the opposite conditions of pressure thereon occupies the extreme right-hand position shown in dotted line. Outlet line 86 is connected to the right-hand end of the cylinder 91 containing piston 90 and the brake cylinder inlet line 76 is connected near the center of the length of the cylinder 91, between the two extreme positions of the piston. Accordingly, when the normal brake control system 80 applies a positive pressure to the right-hand side of cylinder 91, the piston 90 thereof slides to the left to allow the pressure to be transmitted to brake-cylinder pressure line 76 as required for operation of the brakes. The free sliding of the piston 90 to the left described above is permitted by virtue of the fact that the left-hand end of cylinder 91 communicates with a solenoid valve 95 by way of interconnecting line 96, the solenoid valve 95 in its normal, non-actuated position providing connection only between line 96 and a vent opening 97, as shown by the position of the port 98 in solenoid valve 95.

However when the railroad car is decoupled from the train for humping purposes in the railroad yard, the connection of the pressurized train pipe 82 is broken and pressure is therefore no longer supplied thereto; the normal brake control system 80 and the lines connected thereto are then bled substantially to atmosphere by an operator or by mechanical means, before the car is subjected to the sorting operation. This also causes check valve 99 to close and to retain a positive pressure in the air reservoir 100 for the automatic brake system. Under these conditions there is normally a small residual positive pressure on the right of the slide 90 so that it is held to the left of the connection to brake-cylinder pressure line 76. However, when the object detector 64 produces a control current through the coil 101 of solenoid valve 95 in response to the repetitive detection of a reflective object in front of the rolling car in a distance range $D_{min}$ to $D_{max}$ (e.g., 25 to 60 feet), the solenoid valve 95 is actuated to provide connection between the air reservoir 100 and the interconnecting line 96 by way of port 98a inside the solenoid valve. This applies a positive pressure to the left side of piston 90, causing it to slide to its right-hand position and thereby permitting positive pressure from air reservoir 100 to be applied through line 76 to brake cylinder 74, and to operate the brakes on the car wheel 70. When the control current through coil 101 disappears, solenoid valve 95 returns to its normal condition in which line 96 is connected to vent 97, at which time the pressure in the brake cylinder 74 is relieved by backflow through line 76, cylinder 91, line 96 and vent 97, thereby terminating the braking action.

In the usual operation of the system including the inventive portions thereof, such termination of the control current through coil 101 occurs when the rolling car has approached within about 60 feet of the car against which it is to be impacted, has been braked by the automatic operation described above, and has experienced a drop in rolling velocity to below the velocity $V'_{min}$, typically about three miles per hour, at which time ground-speed sensor 55 permits relay 56 to open and remove electrical operating power (B+) from the object detector 64. This terminates the control current through coil 101 with consequent releasing of the brakes. The car then rolls gently into the one ahead as desired.

FIGURE 4 shows in block form an object detector constructed in accordance with the invention for providing the above-indicated braking control current to solenoid-valve coil 101 and including means for completely automatic operation and for discrimination against interference with the desired operation by various common types of interfering signals, including signals produced by the presence of reflective objects other than the preceding car against which the equipment-carrying car is to be impacted.

The object detector comprises a free-running timing pulse multivibrator 102 which produces at output terminal $a$ thereof a periodically-recurrent rectangular wave such as is represented at A of FIGURE 5. The repetition period P of the wave is set at a value equal to that required for ultrasonic waves to propagate to, and to return from, objects located at the maximum range $D_{max}$ at which it is desired to sense the presence of the preceding car. For example, if the effective maximum range of the equipment is to be about 60 feet, the timing pulse repetition period may be about 108 milliseconds. The positive portion E of the output at $a$ has a duration of 45 milliseconds, corresponding to 25 feet in range, and represents the "early gate" interval in this example; the more-negative portion L of substantially zero voltage has a duration of 63 milliseconds corresponding to 25 to 60 feet in range, and represents the "late-gate" interval. The multivibrator 102 is of conventional type, having a complementary output terminal $b$ at which the output signal is like that at terminal $a$ but of opposite polarity, which is used to actuate an "early-gate" circuit as set forth hereinafter.

The leading edge of each timing pulse is used to actuate a monostable trigger pulse multivibrator 103, which responds to produce a short trigger pulse in response to each such actuation, as represented at B of FIGURE 5. In the present example, a trigger pulse duration of about 1½ millisecond is typical.

The trigger pulse from multivibrator 103 is supplied to a pulse-controlled ultrasonic oscillator 104 to cause it to produce output pulses of ultrasonic-frequency energy, such as 18 kilocycles per second for example, during each applied trigger pulse. The ultrasonic pulses are passed through a suitable amplifier 105 and duplexer 106 to the control elements of the A-end electro-acoustical transducer and radiator 108 causing the latter transducer to radiate pulses of ultrasonic energy directed generally forwardly, i.e. in the direction of motion, of the vehicle which carries the equipment, by means of a suitable directional parabolic reflector 109. Such transmitted signals are represented at C of FIGURE 5, it being understood that in general each pulse will contain many more cycles of ultrasonic wave energy than are shown in the figure. The parabolic reflector 109 also selectively receives reflections of the transmitted pulses which return to it along generally the same direction as the track in front of the car. However it will be understood that the parabolic reflector 109 will, in general, not have ideal directional characteristics and will permit a certain degree of divergence of the transmitted beam of ultrasonic energy as well as a certain amount of side-lobe transmission and reception, so that reflections are also received in some degree from railroad ties in the bed of the track and from other objects such as poles or buildings adjacent the track other than the immediately-preceding car which it is desired to detect.

Reflections of the ultrasonic pulses received by parabolic reflector 109 of electro-acoustic transducer 108 are supplied by way of duplexer 106 to the input of ultrasonic frequency (U.F.) amplifier 110. The duplexer 106 may be of any of a number of known types and serves the usual purpose of channeling the outgoing pulses primarily to the electro-acoustic transducer and the received pulses primarily to the U.F. amplifier 110.

A solenoid-controlled switch 111 between duplexer 106 and electro-acoustic transducer and radiator 108 provides the above-described path for ultrasonic energy when solenoid coil 112 thereof is supplied with current by way of direction control switch 67. However, when the car rolls in the opposite direction the direction control switch 67 is operated to its opposite position, current through solenoid 112 ceases, and bias spring 113 connects duplexer 106 to B-end electro-acoustic transducer and radiator 114 and its parabolic reflector 115, which are identical with the corresponding A-end elements.

The amplified ultrasonic frequency signals from amplifier 110 are supplied to detector 118 which detects the pulse modulation thereof and supplies the detected pulses through blanking and amplifying circuit 120 to Schmitt trigger circuit 122. The signal from detector 118 produced in response to each transmitted pulse is represented at D of FIGURE 5, and the blanking pulses are represented at E thereof. The blanking pulses are generated in monostable blanking pulse multivibrator 123 in response to pulses from trigger pulse multivibrator 103; they are applied to blanking and amplifying circuit 120 to prevent contemporaneous signals from passing through the latter circuit in appreciable amplitude. A typical duration for the blanking pulses is about 15 milliseconds. Amplifier 110, detector 118, blanking and amplifying circuit 120 and Schmitt trigger circuit 122 are preferably direct coupled, so that a variable DC bias control in the last stage of amplifier 110 can be used to vary the DC level at the input to the Schmitt trigger circuit. The Schmitt trigger circuit has a threshold level (T$h$ in FIGURE 5D) at its input which must be exceeded before the trigger circuit will be operated to produce an output pulse. The DC level control in amplifier 110 therefore serves as the threshold level control for Schmitt trigger circuit 122.

Referring to waveform D of FIGURE 5, the detected signal there represented includes high-amplitude broad pulses such as $m$ produced by the interfering effects of the operation of the pulse transmitter during each pulse transmission; the narrow, relatively high-amplitude pulses such as $n$ may be produced by reflections from objects such as utility poles disposed along the track sides, and the smaller pulses such as $p$ by reflections from railroad ties in the track bed. The smaller signals in the intervals such as $q$ may be produced by general background noises, such as whistles, rumbling and minor reflections. The high-amplitude pulses $w$ are produced by the desired reflections from the immediately-preceding car on the same branch track.

The threshold level T$h$ of Schmitt trigger circuit 122 shown at D of FIGURE 2 eliminates the lesser signals such as those represented at $n$, $p$ and $q$. As represented at F of FIGURE 5, the only signals then exceeding the transmitter interference pulses such as $m$. The blanking pulses eliminate the latter interfering pulses $m$, and accordingly the Schmitt trigger circuit 122 produces an output pulse, as represented at G of FIGURE 5, only in response to the desired target pulses $w$.

Each pulse produced by Schmitt trigger circuit 122 in response to a target object in the "late-gate" interval is passed through buffer amplifier 124 and is differentiated in differentiating circuit 126 to produce a pair of negative and positive-going narrow spikes of voltage which then pass through "late-gate" circuit 128 to a clipper 130 wherein the positive voltage spike is removed, leaving a narrow negative trigger spike sufficient to change the conduction state of the bistable multivibrator 132. The foregoing assumes that the "late-gate" circuit 128 is in its transmissive position, which is the case only during the "late-gate" time interval corresponding to 25 to 60 feet in target range. This operation is accomplished by utilizing a form of "late-gate" circuit 128 which is non-transmissive except during the more negative portion of the timing pulse from the $a$ output of free-running timing pulse multivibrator 102, the latter pulse being applied to the control terminal of "late-gate" circuit 128 by way of lead 133.

Accordingly the conduction state of bistable multivibrator 132 is switched upon the reception of a target pulse during the "late-gate" interval, the original conduction state thereof being resumed in response to a reset pulse applied thereto from monostable trigger pulse multivibrator 103 by way of lead 134. The result is that bistable multivibrator 132 produces a rectangular output pulse having a width dependent upon the range of the target object from the ultrasonic radiator on the equipment-carrying car, the greater the range the smaller the width of the pulse. Such a rectangular pulse is represented at H of FIGURE 5.

The rectangular pulse from bistable multivibrator 132 is applied to the input of a sawtooth circuit 136, which acts as a pulse integrator and produces an output in the form of a sawtooth of voltage for each input rectangular pulse, each sawtooth beginning at the time at which the rectangular pulse begins and terminating at the termination of the rectangular pulse as shown at I of FIGURE 5. The slopes of the sawteeth are substantially the same for all sawteeth, and accordingly the peak amplitudes of the sawteeth vary in direct proportion to the widths of the input rectangular pulses from bistable multivibrator 132.

The latter sawteeth of voltage are passed through buffer amplifier 138 to closing-speed sensor circuit 140. The latter circuit has the capability of effectively ignoring input sawteeth of voltage applied thereto produced by preceding targets while producing output voltage pulses in response to sawteeth produced by certain closing targets, i.e., targets whose range from the transmitting equipment is decreasing. In some forms of the invention the closing-speed sensor circuit 140 may produce output pulses for all closing speeds, but in the present preferred embodiment of the invention it also ignores sawteeth due to targets having closing speeds less than a predetermined threshold speed (three miles per hour, for example), and responds only to those due to targets having appreciably higher closing rates. Preferably the closing-speed sensor circuit 140 comprises a novel circuit arrangement, various forms of which are described hereinafter, which is able to sense whether the sawteeth applied thereto are increasing in amplitude or decreasing in amplitude, and, if increasing in amplitude, whether the rate of increase is greater than a predetermined rate. In any event, in the preferred embodiment closing-speed sensor circuit 140 produces a series of continually-repeating output pulses only when the closing speed to the target is positive and in excess of a predetermined speed, such as three miles per hour; for other targets it produces only a few initial output pulses which, as described hereinafter in detail, are rendered ineffective to produce braking.

The pulses from the closing speed sensor circuit 140, which occur once per cycle of operation in response to the nearest rapidly-closing target object within the "late-gate" interval, are passed through a gate circuit 142 to trigger a monostable multivibrator 144. The output pulses of the monostable multivibrator 144, represented at J of FIGURE 5, are then supplied to the input of a memory integrator and threshold circuit 146. The latter circuit typically includes a capacitor which is charged by the pulse from monostable multivibrator 144 at a predetermined rate and decays relatively slowly between such pulses. The result is that, if pulses are applied to it by monostable multivibrator 144 in response to a number of successive transmitted pulses, the voltage on the capacitor increases stepwise until it attains a threshold value sufficient to produce an output to trigger the Schmitt trigger circuit 148, as represented at K of FIGURE 5. The time constants in the memory integrator and threshold circuit can be adjusted for optimum operation in any particular application, and in the present example the circuit is preferably adjusted so that the Schmitt trigger circuit 148 is operated if a pulse is provided by monostable multivibrator 144 in response to each of three successive transmitted pulses, but is not operated if such pulses are missing for two successive transmitted pulses, as illustrated at L of FIGURE 5.

The output of the Schmitt trigger circuit 148 is passed through a solenoid-driver amplifier 150 to coil 101 of solenoid-operated valve 95 shown in FIGURE 3, to apply the brakes to the vehicle carrying the equipment.

Another output of the Schmitt trigger circuit 148 is supplied to brake holding circuit 152, which includes memory or storage apparatus which, upon receiving output signals from the Schmitt trigger circuit for a predetermined number of transmitted interpulse intervals such as six, produces an output which is applied to the input of the Schmitt trigger circuit 148 to maintain it in its actuated condition; coil 101 is thereby supplied with a steady current to maintain the brakes on even though the output of memory integrator and threshold circuit 146 may disappear due, for example, to the target object moving within the "early-gate" and blanking ranges.

In addition to the foregoing, the system includes an arrangement for preventing initiation of braking in the event that a target object is within the "early-gate" interval. To provide this operation, the output of buffer amplifier 124 is supplied to a differentiating circuit 160, which may be like circuit 126, and by way of an "early-gate" circuit 162 and a clipper 164 to bistable multivibrator 166, which may be like the corresponding elements 128, 130 and 132 described above. In the absence of appropriate gating signals applied thereto, "early-gate" circuit 162 is not transmissive of the differentiated spikes of voltage applied thereto from differentiating circuit 160. However, in response to the more negative portion of the output waveform from output terminal $b$ of free running timing pulse multivibrator 102, which occurs contemporaneously with the "early-gate" interval, the "early-gate" circuit 162 is rendered transmissive of the voltage spikes. The latter spikes are applied to clipper 164, which removes one of them and passes the other one to bistable multivibrator 166 to switch its conduction state. The latter bistable multivibrator is again, as in the case of bistable multivibrator 132, returned to its initial conduction state by pulses supplied from monostable trigger pulse multivibrator 103, over lead 168.

Operation of bistable multivibrator 166 in response to triggering spikes from clipper 164 and in response to reset pulses produces rectangular output pulses which are applied to a pair of erase circuits 170 and 172. Erase circuit 170 is connected at its output to sawtooth circuit 136 and, when actuated by the pulse from bistable multivibrator 166, prevents the formation of sawteeth in sawtooth circuit 136. Erase circuit 172, when actutaed by pulses from bistable multivibrator 166, prevents closing-speed sensor circuit 140 from operating to produce output pulses. While either of the erase circuits 170 and 172 by itself is sufficient in many applications, the combination makes it even more certain that under no unusual or fortuitous circumstances can there be an output pulse from the closing-speed sensor circuit 140 when signals are received from a target object during the "early-gate" interval.

The general significance of the operation of the "early-gate" portion of the circuit is illustrated by the waveforms of FIGURE 6. The waveform at A of FIGURE 6 illustrates the terminal $b$ output of free-running timing pulse multivibrator 102, the more negative regions of which represent the "early-gate" interval and the more positive portions of which represent the "late-gate" interval. The waveform at B of FIGURE 6 illustrates a form of detected signal which may be produced from detector 118 when a target object is located at a short range within the "early-gate" interval. $m_1$ represents the interfering effect of the transmitted pulse on the receiver, $w_1$ represents a pulse produced by a car immediately ahead of the equipment bearing car due to one round-trip of transmitted energy, and $w_2$ represents a later-received reflection due to the same transmitted pulse which has made two round-trips by being reflected from the equipment-bearing car and re-reflected from the car immediately ahead. Reflection $w_1$ may be somewhat reduced in amplitude as shown, due to the use of time-varying gain in the ultrasonic frequency amplifier 110, but in this example both $w_1$ and $w_2$ nevertheless exceed the threshold level $Th$ required to operate the receiver Schmitt trigger circuit 122, as represented at C of FIGURE 6. Furthermore, while the interfering signal $m_1$ lies within the blanking interval and is effectively removed, the reflections $w_1$ and $w_2$ occur after the blanking interval and can cause actuation of the Schmitt trigger circuit 122.

If the car immediately ahead in the train produced no later reflections than are shown at C, the latter reflections would produce no interference with normal operation particularly in view of the presence of the "late-gate" circuit 128 which permits response of the system only to reflections received after the end of the "early-gate" interval. However, in some cases a reflection may be received in the "late-gate" interval even though the equipment-bearing car is in a train line with a car immediately adjacent and ahead of it. Signals producible in such a situation are illustrated at D of FIGURE 6, where the reflection $w_3$ occurs just after the end of the "early-gate" interval. Generally, a pulse such as $w_3$ will occur due to subsequent round-trip reflections of the same transmitted pulse, although it can conceivably arise due to other causes as well. The pulse $w_3$ is therefore capable of operating the bistable multivibrator 132 to produce an output pulse therefrom as shown at E of FIGURE 6.

However, under such circumstances the reflections $w_1$ and $w_2$, received during the "early-gate" interval when the equipment-carrying car is in a train line, operate the erase circuits 170 and 172 to prevent any output from closing-speed sensor circuit 140. Thus there is shown at F of FIGURE 6 a dotted sawtooth curve such as would be produced by the reflection $w_3$ in the absence of the "early-gate" system, the solid curve of waveform F, however, showing the output of sawtooth circuit 136 actually produced due to the operation of erase circuit 170. Operation of erase circuit 172 further assures that there can be no output from the closing-speed sensor circuit. Accordingly, the presence of a car immediately adjacent and ahead of the equipment-bearing car is sensed and utilized to prevent the system from responding even to reflections received during the "late-gate" interval. In this way the brakes are prevented from being applied when the car is in a moving train line.

It will be appreciated that the closing-speed sensor circuit 140 in itself will usually prevent operation of the brakes when the equipment-carrying car is in a train line, since the closing speed is then zero. However, the multipath reflections and other types of spurious reflections which can occur during the "late-gate" interval when the car is in a train line are often sporadic and unpredictable, and may under some circumstances simulate a closing target so that the closing-speed sensor circuit would be actuated if the erasing circuits 170 and 172 were not operated by the "early-gate" arrangement to prevent such actuation. The "early-gate" system therefore provides definite assurance that the brakes of the vehicle will not be applied when it is in a train line.

As described hereinafter in detail in connection with FIGURE 7, the "early-gate" system acting through erase circuit 172 also assures that the closing-speed sensor is properly cleared of the effects of "stale echo" reflections.

In addition, a complementary output of bistable multivibrator 166 is used to eliminate the effects of the few pulses produced by the preferred form of closing-speed sensor 140 in response to reflections from objects moving away from the equipment-carrying car. More particularly, these pulses from bistable multivibrator 166 are supplied over line 186 to momentary hold circuit 188, which responds thereto to apply an output gate-biasing voltage to gate circuit 142 which continues for a predetermined short time interval, even after a receding target object has moved out of the "early-gate" region into the "late-gate" region. This biasing voltage renders gate circuit 142 momentarily non-conductive during the time when reflections are first received from the receding target object in the "late-gate" region, and thus prevents the initial few pulses from closing-speed sensor circuit 140 from passing to, and operating, the monostable multivibrator 144.

Further details of the circuitry of the object detector, and particularly details of various forms of the novel closing-speed sensor of the invention, are illustrated by way of example in FIGURES 7–10.

Referring first to FIGURE 7, it will be understood that the complete object detector includes in addition to the elements shown in detail the free-running timing pulse multivibrator 102, the monostable trigger pulse multivibrator 103, the pulse-controlled ultrasonic oscillator 104, the amplifier 105, the duplexer 106, the solenoid-controlled switch 111, the electro-acoustic transducer and radiator 108 with its reflector 109, the electro-acoustic transducer and radiator 114 with its reflector 115, and the monostable blanking pulse multivibrator 123 of FIGURE 4, but since they may be entirely conventional in design and are illustrated in FIGURE 4, their showing is not repeated in FIGURE 7 in the interest of clarity of exposition.

The received signals from duplexer 106 are supplied to the input of the ultrasonic amplifier enclosed in the dotted block 110, corresponding to block 110 of FIGURE 4. It may consist of the two conventional amplifier stages designated 202 and a following third stage which is shown in detail. The third stage consists of a NPN transistor 204 having its collector connected by way of a collector load resistor 206 to the B+ line 208, and having its emitter connected to ground line 210 by way of an emitter-biasing circuit comprising a parallel combination of a resistor 212 and a capacitor 214. Bias for the base of the transistor is supplied from a tap point 216 on a bleeder comprising fixed resistors 218 and 220 connected in series with variable resistor 222 between the B+ line and ground. Signals from the preceding two amplifying stages are coupled to the base of transistor 204 by way of capacitor 226. The arrangement described in detail constitutes a conventional transistor amplifying stage with variable base bias. The amplifier 110 preferably includes circuits for producing time-varying gain in response to blanking pulses supplied over lead 227.

Output signals from the collector of transistor 204 are connected to the anode of a detector diode 230, the cathode of which is connected to ground line 210 by way of the parallel combination of resistor 232 and capacitor 234 which together provide the appropriate time constant for eliminating the ultrasonic carrier frequency and for producing at the cathode of rectifier 230 a detected version of the received signals.

The cathode of rectifier 230 is also connected to the anode of blanking diode 236, the cathode of which is supplied with negative blanking pulses from blanking pulse multivibrator 123 of FIGURE 4. In the absence of a blanking pulse, the diode 236 isolates the cathode of rectifier 230 from the blanking pulse multivibrator, but during the negative blanking pulse the diode 236 is rendered conductive so that the cathode of rectifier 230 is held at a low potential, such as ground. Since the cathode of rectifier 230 is directly coupled to the base of transistor 240 of the NPN type, the latter transistor is rendered non-conductive during the blanking pulse by the operation just described so as to provide the desired amplifier blanking.

The output signals from the detector rectifier 230 produced after each blanking interval are applied to the base of transistor 240, the emitter of which is connected to ground through a resistor 242 and the collector of which is connected directly to the positive supply line 208. This combination forms a conventional type of emitter-follower amplifier or buffer stage.

The output of the emitter follower is applied by way of series resistor 244 to the input of a conventional Schmitt trigger 246. The Schmitt trigger 246 requires an input voltage of a predetermined minimum level to trigger it. The received and detected signals supplied to the input of Schmitt trigger 246 are riding on a DC component determined by the ratio of the resistance of resistor 218 and the summation of the resistances of resistor 220 and of adjustable potentiometer 222. The potentiometer 222 is the threshold adjustment and is set so that detected signals of a specific minimum amplitude are required to operate the Schmitt trigger 246.

In addition, as described above, the input level to the Schmitt trigger 246 is clamped to a non-operative level during negative blanking pulses from monostable blanking pulse multivibrator 123 throughout a predetermined time interval immediately following each transmitter pulse. The blanking pulses are represented in the waveform at E of FIGURE 5, and in the present example each blanking pulse may have a duration of about 15 milliseconds and is of sufficient magnitude to prevent operation of the Schmitt trigger 246 even is received signals are present.

As represented at D in FIGURE 5, the threshold level $T_h$ for the detected signals is set so that lesser interfering signals, such as small reflections from ties and general background noise are insufficient to exceed the threshold level. The waveform at F of FIGURE 5 illustrates the signals in excess of the threshold level in the detected signal shown at D. Because of the blanking, the only signals effective to operate the Schmitt trigger 246 are the target pulses shown at G of FIGURE 5.

Activating the Schmitt trigger 246 in response to a pulse due to reflection from a desired target object applies a pulse by way of coupling capacitor 248 to the base of NPN transistor 250.

The transistor 250 along with its associated base resistor 252, emitter resistor 254 and load resistor 256, amplifies and inverts the pulses from Schmitt trigger 246 and performs the function of buffer amplifier 124 of FIGURE 4. The output pulse at the collector of transistor 250 is negative-going.

Negative target pulses from transistor 250 are supplied through isolating diode 257 and differentiating, gating and clipping circuits to the base of bistable multivibrator 258. Capacitor 260, resistor 262 connected between the anode of diode 257 and B+ line 208, and resistor 264 connected from the opposite side of capacitor 260 to the $a$ output terminal of the free-running timing pulse multivibrator (102 in FIGURE 4) cooperate to differentiate the output pulse and convert it to a positive spike and a negative spike. Diode 266 clips off the positive spike but permits the negative spike to pass when, and only when, the "late-gate" signal applied through resistor 264 is in its more negative condition; the "late-gate" signal in this example is positive during the "early-gate" interval so as to cut off diode 266, and is at substantial zero or ground potential during the "late-gate" interval so diode 266 can then conduct to pass the negative voltage spikes.

Bistable multivibrator 258 is of conventional form, typically comprising a pair of transistors cross-connected and biased so as to have two stable states; in one state one transistor is heavily conductive or ON, and the other transistor is OFF, and in the other state the conduction conditions of the transistors are reversed. A trigger pulse applied to one control input from diode 266 flips the circuit to one of its conduction states and a reset pulse applied to another control input from the monostable trigger multivibrator (103 of FIGURE 4) resets it to its original conduction state. The transistors may be connected in the common-emitter configuration between about ground potential when reset and at about B+ potential when activated by a received signal. Positive rectangular pulses are thereby produced by multivibrator 258 at its output terminal 270, each such pulse beginning at the beginning of the first target reflection received during the "late-gate" interval and ending at the time of the following transmitted pulse as shown in FIGURE 5H.

The rectangular pulse from bistable multivibrator 258 is applied to the sawtooth circuit outlined by dotted rectangle 136, corresponding to element 136 in FIGURE 4. The sawtooth circuit comprises a PNP transistor 272 the emitter of which is connected to slope-setting resistor 274 to output terminal 270 of bistable multivibrator 258. The base of transistor 272 is connected to the center of a voltage divider consisting of resistors 276 and 278 connected in series between B+ and ground. A capacitor 280 is connected between the collector of transistor 272 and ground. The collector of transistor 272 is also connected to the anode of a diode 282, the cathode of which is connected back to bistable multivibrator output terminal 270. This circuit functions as a constant current source in response to the rectangular pulse from multivibrator 258 to charge capacitor 280 substantially linearly during the multivibrator pulse. Upon the termination of each such multivibrator pulse, multivibrator output terminal 270 is effectively connected internally to ground potential, so that capacitor 280 then discharges substantially completely by way of diode 282. One such sawtooth voltage pulse is illustrated at I of FIGURE 5.

The sawtooth voltage at the collector of transistor 272 is direct-coupled to the base of transistor 284 of the NPN type, which performs the function of buffer amplifier 138 of FIGURE 4. The collector of transistor 284 is directly connected to B+ line 208 while its emitter is grounded through emitter resistor 286. Output is taken from the emitter, and hence transistor 284 operates as an emitter-follower.

The emitter of transistor 284 is direct-coupled to the base of NPN transistor 288, which together with the other elements enclosed within the dotted rectangle 140 constitutes the closing-speed sensor 140 of FIGURE 4. In order to understand better the construction and operation of the closing-speed sensor circuit and the inventive nature thereof, there will first be described several simpler forms of closing-speed sensors which may be employed in certain applications of the invention.

Thus there is shown in FIGURE 8 an NPN transistor 290 having a collector resistor 292 connected to the B+ line. The emitter of the transistor is connected to the anode of a diode 294, the cathode of which is connected to ground by way of the parallel combination of a capacitor 296 and a high-valued resistor 298. A conventional base resistor 300 is also employed, between the base and ground. The sawteeth of voltage from transistor 284 in FIGURE 7 may be applied to the base of transistor 290. The circuit has the characteristic that the transistor 290 is normally biased in a non-conductive state and is rendered conductive only when its base potential is driven appreciably more positive than its emitter potential. Under the latter circumstance, and only then, current will flow through collector load resistor 292 and through the emitter of transistor 290 and diode 294 to charge the capacitor 296. Thereafter the high value of resistor 298 then permits discharging of capacitor 296, but only at a very slow rate compared to the time between transmitter pulses.

The manner in which this circuit may function as a closing-speed sensor will be better understood from a consideration of certain waveforms in FIGURE 11. The waveform at A of FIGURE 11 represents the form of sawteeth which may be produced by sawtooth circuit 136 in response to a target object moving away from the object detector. Such a target object is initially at relatively close range and, when it reaches the beginning of the "late-gate" interval will produce the relatively wide, and hence relatively high amplitude, sawtooth pulse shown at $S_1$ of waveform A. As the distance to the target object increases, the width, and hence the height, of the sawteeth decreases as shown at A of FIGURE 11. If the distance between the object detector and the target object is decreasing, corresponding to the closing condition, the successive sawteeth will have progressively greater amplitudes as represented at B of FIGURE 11. If the distance between object detector and target object is fixed, the sawteeth will maintain a constant amplitude.

Referring now again to FIGURE 8, if sawteeth of diminishing amplitude are supplied to the base of transistor 290, the first sawtooth will turn on the transistor and charge the capacitor 296 nearly to the full peak amplitude of the first sawtooth; the next several sawteeth substantially complete this charging. The voltage of capacitor 296 after these few initial sawteeth will therefore remain substantially at this peak voltage, as will the emitter of transistor 290, so that the subsequent smaller-amplitude sawteeth are insufficient to drive transistor 290 into conduction. Accordingly for an "opening" target object there will be relatively-large initial current pulses through collector resistor 292 and a few corresponding negative voltage pulses at the collector of transistor 290, but no subsequent pulses. As will be explained in detail hereinafter, provision is made elsewhere in the system to prevent such initial output voltage pulses from having any effect on brake operation, and accordingly the circuit of FIGURE 8, if substituted for the form of closing-speed sensor shown in FIGURE 7, will be effective to prevent operation on receding target objects. The same reasoning applies to target objects which are at a substantially fixed distance from the object detector.

However, when a waveform produced by a "closing" target object, and having the progressively-increasing sawtooth amplitude represented at B of FIGURE 11, is applied to the base of transistor 290, each successive sawtooth raises the potential of the base of transistor 290 more positive than the voltage to which capacitor 296 was charged by the previous sawtooth. Accordingly, at the peak of each sawtooth the transistor 290 becomes momentarily conductive to produce a pulse of charging current into the capacitor 296 and a corresponding pulse of voltage at the collector of the transistor 290.

The circuit of FIGURE 8 therefore discriminates between "closing" and receding targets by producing a continually repeating series of negative output pulses only in repsonse to "closing" target objects. Such a circuit can be utilized in the system illustrated in FIGURE 7 in applications in which it is satisfactory merely to delete the effects of reflections from receding and stationary objects and it is not required also to delete the effects of reflections from objects having closing rates which are positive but less than a predetermined minimum closing rate. Such a simplified system will find utility in many applications.

The diode 294 in FIGURE 8 is not essential to the operation of the circuit in many of its embodiments, but is included as a protection against the possibility of reverse breakdown of the base-to-emitter region in the transistor which may tend to occur in certain transistors in the intervals between sawteeth when the voltage on the capacitor, and hence on the emitter, is relatively high and in the direction to reverse-bias the emitter-base diode of transistor 290.

FIGURE 9 shows a closing-speed sensor which, like that illustrated in FIGURE 7, distinguishes between reflections from target objects having closing speeds in excess of a predetermined value and target objects having lower closing speeds, or which are actually receding. Parts corresponding to those of FIGURE 8 are indicated by corresponding numerals with the suffix A. The circuit is the same as that of FIGURE 8, with the exception that one end of a resistor 302 is connected to the upper, ungrounded plate of capacitor 296A, the other end of resistor 302 being supplied with rectangular pulses, preferably one for each transmitted pulse from the object detector.

The purpose and function of the circuit will be appreciated from a comparison of the waveforms shown at B and C of FIGURE 11. Both of the waveforms B and C represent waveforms produced by the sawtooth circuit 136 in response to closing target objects located in the "late-gate" region; however, they differ in that the waveform at B represents that produced by a traget object having a closing speed below the threshold speed for which brake actuation is desired, while the waveform at C represents that produced by a target object having a speed in excess of the threshold closing speed. Because of this difference in closing speed, the sawteeth in waveform B rise at a rate, represented by the slope of the stright line $L_1$, which is smaller than that for the waveform at C, represented by the slope of the line $L_2$.

In general, the circuit of FIGURE 9 distinguishes between two such target objects by independently charging the capacitor 296A at a rate substantially equal to the rate at which it would be otherwise charged up by sawteeth produced by a target object moving at the threshold speed. If then the target object is moving below the threshold speed, the resultant sawteeth applied to the base of transistor 290A will not increase as fast as the voltage on capacitor 296A, and hence transistor 290A will never conduct under such circumstances. However, if the target object is moving at a speed in excess of the threshold speed, as in the waveform at C of FIGURE 11, the peak amplitudes of the sawteeth will increase more rapidly than the independent charging of capacitor 296A, so that conduction will occur in transistor 290A in response to the peaks or upward tips of each of the sawteeth, thereby providing repetitive pulses of negative voltage at the collector of the transistor in response to each sawtooth. For zero or negative closing rates only a few initial negative output pulses are produced, as in the embodiment of FIGURE 8.

Accordingly the threshold closing speed for a circuit such as that of FIGURE 9 is determined by the rate at which capacitor 296A is charged by way of resistor 302. The voltage used to produce this independent, direct charging of the capacitor may be designated as the threshold biasing voltage. The rate of charging by the threshold biasing voltage can be varied at will through selection of the value of resistor 302, or through selection of the magnitude or widths of pulses of voltage applied to the latter resistor. In some forms of the invention, rectangular pulses of equal widths may be applied by way of resistor 302 to the capacitor 296A; for example, the rectangular output pulses of Schmitt trigger 246 may be used. The latter type of rectangular pulses are represented at D of FIGURE 11, where the rectangular waveforms represent the rectangular pulses applied to resistor 302 and the diagonal lines within each of the pulses represent the charging of capacitor 296A produced by each such pulse. As represented by the slope of the line $L_3$, the rectangular pulses produce an average rate of charge of capacitor 296A which lies between the rates of increase in peak amplitude of the sawteeth of the waveforms in B and C, respectively, so that discrimination between low closing speeds and high closing speeds will be provided.

However, due to the exponential charging characteristics of the capacitor 296A, the increase ΔV in voltage of the capacitor produced in response to the threshold biasing pulses decreases somewhat with successive pulses, and the charging of the capacitor is therefore not linear.

As a result, the closing-speed sensor in this form has a somewhat different threshold velocity at different ranges. Since this merely affects the accuracy of closing-speed discrimination, such a circuit arrangement is operative but it would be desirable to provide a circuit having a more linear charging rate for the capacitor in response to the rectangular pulses.

In some embodiments of the closing-speed sensor, and in particular in the embodiment represented in FIGURE 7, it has been found that increased linearity of charging by the threshold biasing pulses may be produced by utilizing as the biasing pulses the output pulses of the bistable multivibrator 258, which pulses vary in width in the same manner as the sawtooth. Such operation is represented schematically at E of FIGURE 11, where the decreasing slope of charging of the capacitor is compensated for by a corresponding increase in width of the charging pulse, so that the increments ΔV in capacitor voltage are substantially equal for each succesive charging pulse and a higher degree of linearity is obtained.

The operation of the form of closing-speed sensor shown in FIGURE 7 will now be more readily comprehended. As in the case of the sensor of FIGURE 9, transistor 288 has its collector connected to the B+ line by way of a collector load resistor 306 while its emitter is connected to the anode of a protective diode 308, the cathode of which is connected to ground by way of capacitor 310. A high resistance 312 is connected in parallel with capacitor 310 to permit gradual discharge of the latter capacitor when no target reflections have been received for some time. This discharge is assisted by the path to ground from capacitor 310 through diode 322, resistor 324 and the bistable multivibrator 258 when the output 270 is in the saturated condition (absence of targets). In some forms of the invention the inherent leakage resistance of the capacitor 310 may provide the necessary discharging resistance and no external resistor is then required. Direct charging of capacitor 310 to produce threshold biasing is provided from the output of bistable multivibrator 258 by way of fixed resistor 314, variable resistor 316 and the anode-cathode path of diode rectifier 318. Diode 318 presents discharging of capacitor 310 back through resistors 314 and 316.

In the particular embodiment disclosed in FIGURE 7 the output of the bistable multivibrator 258 was of smaller amplitude than desired for threshold biasing. It was found that charging of the capacitor 310 to the extent necessary was enhanced by also employing a resistor 320, a rectifying diode 322, and another resistor 324 connected in series in that order between the B+ supply line and the output of bistable multivibrator 258, the anode of diode 322 being directly connected to the upper or ungrounded plate of capacitor 310 and the cathode of rectifier 322 being connected to the resistor 324. Diode 322 prevents application of the bistable multivibrator output pulse to the capacitor by way of resistor 324, but allows capacitor 310 to discharge through this path when the bistable multivibrator is not providing a positive pulse output. This path also permits a small amount of charge to be provided continuously on capacitor 310 so that it starts its charging from a voltage somewhat above zero.

The operation of the closing-speed sensor in FIGURE 7, is therefore generally like that described above with reference to FIGURE 9 in that, when the sawteeth of voltage applied to the base of transistor 288 are from a target object having a closing speed in excess of a predetermined minimum, such as three miles per hour, a continuous series of negative output pulses is produced at the collector of transistor 288, while for other target objects only one initial pulse is produced and none thereafter. The threshold velocity can be adjusted by adjustment of the value of variable resistor 316.

Before leaving the closing-speed sensor it will be convenient to describe at this point another embodiment thereof which is useful in many applications. Referring to FIGURE 10, the transistor circuit is like that of FIGURE 8 and corresponding parts are indicated by corresponding numerals with the suffix B. Like the sensor of FIGURE 9 it provides a speed threshold but without using threshold biasing of the capacitor 296B. Instead, voltage changes on capacitor 296B are coupled through a capacitor 327 to a level-sensitive amplifier 328, from which the sensor output is taken. The level sensitive amplifier 328 may comprise a conventional transistor amplifier which is normally biased off, preferably by a variable bias control. Accordingly only input pulses applied through capacitor 327 which exceed a predetermined level will produce output pulses from the amplifier. By reference to waveforms B and C of FIGURE 11 it will be seen that the amount by which each sawtooth tip exceeds the immediately preceding one is greater for higher speeds as shown in waveform C than for lower speeds as shown in waveform B. Since the charging of capacitor 296B is due to these sawtooth tips, the voltage pulses passed through capacitor 327 have a magnitude which increases with target closing speed. By suitable adjustment of the bias of level sensitive amplifier 328 it can therefore be caused to produce repetitive output pulses only in response to input voltage pulses of greater than a predetermined magnitude, and hence only in response to target objects having greater than a predetermined minimum closing speed, as desired. Again, receding target objects or target objects at fixed ranges will produce only a few initial output pulses, the effects of which are deleted later in the system.

Returning to the embodiment of FIGURE 7, the output from the collector of transistor 288 is coupled by way of capacitor 330 and gating diode 322 to a control input terminal 333 of monostable multivibrator 334. Monostable multivibrator 334 is connected between the B+ supply and ground and is of the conventional type which, when supplied at its control input terminal with a negative pulse, responds thereto to produce a single positive output pulse at its output terminal 336. Since the cathode end of diode 332 is connected to capacitor 330, the polarity of diode 332 normally permits the negative pulses from the collector of transistor 288 to actuate the monostable multivibrator 334 in the manner just described in response to each such negative triggering pulse. However, as will be described later herein, when the closing-speed sensor is supplied with sawteeth representing a target object which is moving away, such actuation of monostable multivibrator 334 in response to the few initial output pulses thereby produced from the collector of transistor 288 is prevented by the momentary-hold circuit shown within the dotted rectangle 118 corresponding to the block 188 of FIGURE 4.

The output of monostable multivibrator 334 is a positive pulse which is supplied to the input of the memory integrator and threshold circuit shown in the dotted rectangle 146 and corresponding to the similarly-numbered element in FIGURE 4. More particularly, the monostable multivibrator output pulse is supplied to the anode of a diode rectifier 340, the cathode of which diode is connected to ground by way of a resistor 342 in series with a parallel combination of another resistor 344 and a capacitor 346. The latter circuit operates in known manner to charge capacitor 346 stepwise in response to successive pulses from the monostable multivibrator 334, permitting only relatively slow discharging of the capacitor 346 by way of the high-valued resistor 344 in the absence of monostable multivibrator pulses. The voltage developed across capacitor 346 is applied by way of a current-limiting resistor 348 to the cathode of Zener diode 350, the anode of which is connected to the control terminal of a Schmitt trigger circuit 352.

When a predetermined number of monostable multivibrator pulses have been applied to charge capacitor 346, the voltage on the latter capacitor rises sufficiently to render conductive the normally non-conductive Zener diode 350 and to supply actuating potential to the Schmitt trigger circuit 352. Preferably the value of resistor 342 and the value of capacitor 346 are chosen so that the Schmitt trigger circuit 352 will not be operated unless monostable multivibrator 334 is actuated by pulses during three successive repetition periods of the transmitted pulses. In this way spurious, momentary, but relatively strong, reflective objects are prevented from operating the Schmitt trigger 352.

The output of Schmitt trigger 352 is directly connected to the base of an NPN transistor 354, the collector of which is connected to the B+ line and the emitter of which is connected to ground by way of the coil 101 of solenoid-operated valve 95 shown in FIGURE 3. In its quiescent state, Schmitt trigger circuit 352 has an output which is substantially at ground so that transistor 354 is non-conductive. However, when turned on by input voltage the Schmitt trigger circuit 352 supplies positive bias to the base of transistor 354 to render it conductive. Under these conditions the current through transistor 354, acting through solenoid coil 101, causes the brakes to be applied to the car carrying the apparatus.

The brake holding circuit indicated in the dotted rectangle 152, and corresponding to the similarly-numbered element in FIGURE 4, is arranged as follows. The output of the Schmitt trigger circuit is applied in sequence to one end of a resistor 360, the anode of a diode rectifier 362, the cathode of the same rectifier, and a capacitor 364 the other terminal of which is grounded. Another resistor 366 is connected in parallel with the series combination of resistor 360 and diode 362. This circuit also has an integrating function in that the capacitor 364 is charged to an extent depending upon the amount of time for which the Schmitt trigger circuit 352 is turned on, the capacitor being discharged slowly by way of resistor 366 during intervals in which the Schmitt trigger 352 is not actuated. When Schmitt trigger circuit 352 has been actuated for a sufficient predetermined time, the voltage across capacitor 364 rises sufficiently to break down the normally-nonconductive Zener diode 366 and to apply a positive voltage by way of isolating diode 368 to the input control terminal 369 of Schmitt trigger circuit 352. The latter voltage then maintains the Schmitt trigger circuit in its ON condition, even though no further voltage should be supplied thereto by way of the Zener diode 350. Accordingly, once the Schmitt trigger 352 has been operated for a sufficient period of time, for example one second, the solenoid-driver transistor 354 will remain ON and the brakes will remain applied, until such time as the car velocity falls below the minimum ground speed $V'_{min}$ and the B+ supply for all the circuit is thereby disconnected through the action of ground-speed sensor 55 and relay 56 shown in FIGURE 3.

The "early-gate" and "late-gate" circuit arrangement and operation are as follows. The "late-gate" signal from output terminal $a$ of multivibrator 102, which is positive during the "early-gate" interval and substantially zero during the "late-gate" interval, is supplied to the lower end of resistor 264. During the "early-gate" time the positive portion of the latter signal cuts off gating diode 266 thereby preventing triggering pulses from reaching the bistable multivibrator 258 and preventing the system from generating brake control signals in response to reflections received during the "early-gate" interval.

The "early-gate" control circuitry is generally similar to that described for the "late-gate" circuitry. Thus the output pulses from the collector of transistor 250 are supplied to a circuit consisting of isolating diode 360, resistor 362, capacitor 364, resistor 366, diode 368, and bistable multivibrator 370. The latter elements may be constituted and arranged identically with the corresponding respective elements 257, 262, 260, 264, 266 and 258 described previously. However, in this case the lower end of resistor 366 is supplied with the "early-gate" signal constituting the complement of the "late-gate" control signal in that it has a substantially zero value during the "early-gate" interval and a positive value during the "late-gate" interval. Accordingly, diode 368 is cut off during the "late-gate" interval and bistable multivibrator 370 can be operated only in response to reflections received in the "early-gate" interval.

The negative pulse output of bistable multivibrator 370 is applied in parallel to the cathodes of diode rectifiers 372 and 374. The anode of diode rectifier 372 is connected by way of resistor 376 to the collector of transistor 272, while the anode of diode rectifier 374 is connected by way of resistor 378 to the upper or ungrounded plate of capacitor 310 in the closing-speed sensor. Accordingly, when a reflection of sufficient amplitude is received in the "early-gate" interval the negative output thereby produced from bistable multivibrator 370 renders the erasing diodes 372 and 374 highly conductive and, in effect, holds the upper or normally-ungrounded plates of both capacitor 280 and capacitor 310 substantially at ground potential. This affirmatively prevents any pulse output from appearing at the collector electrode of transistor 288 in the closing-speed sensor and thereby prevents initiation of braking operation. This action occurs even though a reflection may be received in the "late-gate" interval, so long as reflection is also being received in the "early-gate" interval. Accordingly, when the equipment-bearing car is connected in a train line, reflections from a car immediately ahead operating the "early-gate" circuit prevent operation of the brakes even though the train is moving above the speed threshold of the ground-speed sensor.

The other output of bistable multivibrator 370, namely that producing a positive output pulse, is applied to momentary hold circuit shown in the dotted rectangle designated 188 and corresponding to the similarly-numbered block in FIGURE 4. More particularly, the bistable multivibrator output is applied to the anode of a diode rectifier 382, the cathode of which is connected to one end of a resistor 384. The other end of the resistor 384 is connected to ground by way of a parallel combination of another resistor 386 and a capacitor 388. The last-named end of resistor 384 is also connected to the interconnection 389 between capacitor 330 and diode rectifier 332. The value of resistor 384 is such as to permit relatively rapid charging of the capacitor 388 in response to the positive output pulses from bistable multivibrator 370, while resistor 386 has a sufficiently large value to prevent rapid discharging of capacitor 388.

The operation and function of the last-described circuit in effectively deleting the effects of the few initial pulses produced by the closing-speed sensor in response to target objects which are moving away is as follows. When a "moving away" target object is first detected in the "late-gate" region, such target object will have just left the "early-gate" region. Accordingly, while still in the "early-gate" region it will produce an output from bistable multivibrator 370 which charges up capacitor 388 so as to cut off diode 332 and prevent actuating pulses from being applied to the monostable multivibrator 334. Due to the time constant of capacitor 388 and resistor 386, this biasing voltage maintains diode rectifier 332 cut off for an appreciable length of time after the target in question leaves the "early-gate" region and enters the "late-gate" region. This hold time is long enough to keep diode rectifier 332 cut off until after the few initial pulses from the closing-speed sensor have disappeared. Accordingly the above-described action of the momentary hold circuit accomplishes the desired deletion of the effects of such initial pulses from the closing-speed sensor and prevents what otherwise would be an undesired operation of the brakes.

The switching action of bistable multivibrator 370 serves a further function. In the event that the system-carrying car receives an echo from the car it is closing in on when the target car is still beyond even the "late-gate" distance, e.g., 85 to 120 feet away, the echo of the transmitted pulse will be received during the listening period which occurs one period later. The target itself will appear as a target at a range of 85 to 120 feet minus 60 feet, or 25 to 60 feet away, i.e. in the "late-gate" interval. Even if such return echoes are received in insufficient number to activate the brake before the car closes to within a range of 85 feet, the capacitor 310 in the closing-speed sensor will still be appreciably charged due to the "stale echo" reflections received in the "late-gate" interval. If this charge were not removed, the logic of the system would no longer function properly when the target object came within the normal listening range of 25–60 feet and the desired braking action would not be initiated. However, as soon as echoes are received from the car in the above situation in the early listening period (at a range of 70 to 85 feet, which appears as 10 to 25 feet in the system), the bistable multivibrator 370 is switched and discharges the speed-sensor capacitor 310 as described earlier. In this way, the system is ready to function normally when the target object actually moves into the 25–60 feet "late-gate" range.

It will be understood from the foregoing that the object detector described is only operative when it is supplied with B+ supply voltage by way of relay 56, and that this occurs only when the vehicle speed is above a predetermined range, as sensed by ground-speed sensor 55.

The significance of the various target discriminating circuits described above will be more fully understood from a consideration of the following description of typical types of interfering signals which can arise in railroad-car sorting procedures.

Figure 12:
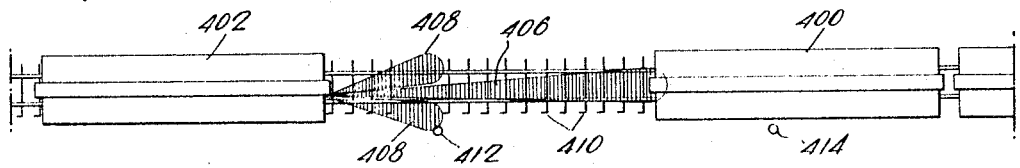
FIGURES 12 and 13 are schematic plan and side views of a railroad car and track system to which reference will be made in explaining how certain types of interfering signals may arise.
Figure 13:
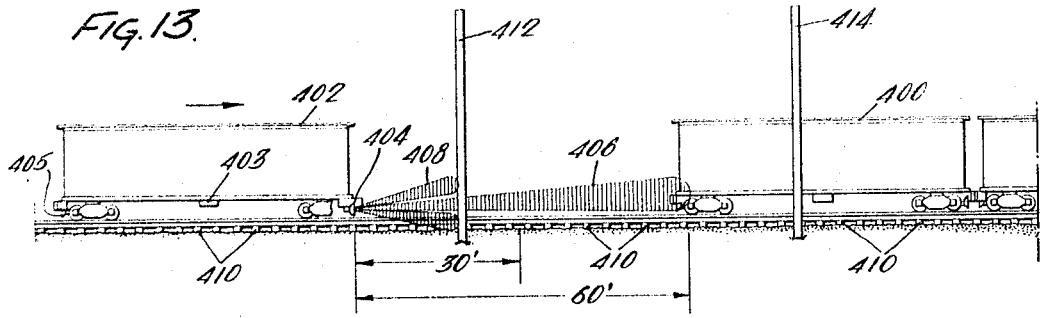

FIGURES 12 and 13 show top and side views of a portion of a typical branch track on which there is a stationary car 400 and a rolling car 402 approaching it along the track. The automatic braking system 403 including the above-described object detector and control circuits, is mounted on a lower portion of the car 402 with parabolic reflectors 404 and 405 at each end of the car. As shown, the radiation and reception pattern of the parabolic reflector 404 discussed previously consists of a main forwardly-directed pencil-like beam 406 and a lesser side-lobe 408. Also shown are railroad ties 410, and a pair of utility poles 412 and 414 disposed along the side of the track. The situation is shown in which the rolling car 402 has just reached the effective maximum range $D_{max}$ of the system, in this case assumed to be 60 feet.

Signals produced by objects within 10 to 25 feet are recognized and actuation of brakes is prevented unless the object is first detected at long (25–60 feet) range to assure the brakes do not operate when the car is being pushed in a line with other cars adjacent to it, as when it is being taken from a receiving yard to the hump.

Ideally, the only reflections occurring during the sensitive period which exceed the threshold level would be those due to reflections from the desired stationary car 400. However, it is possible for even a small object such as a railroad tie to produce a return reflection during a sensitive interval of the receiver which exceeds the threshold level in response to a given transmitted pulse. This can occur because, at one critical angle between the parabola of the object-detecting apparatus and the small reflecting object, the individual reflections from various parts of the object may add up in phase momentarily to produce an unusually strong reflection. However, this critical angle will be changed even by a small relative motion between object detector and reflecting object, and hence the tie reflection will exceed the threshold level for only one or possibly two transmitted pulses. As explained previously, even if such an anomalous strong interfering reflection should occur for one or two transmitted pulses, it will not be capable of operating the memory integrator and threshold circuit 146 and hence will not operate the brakes of the rolling vehicle. This is true no matter at what portions of the travel of the rolling vehicle the anomalous signal appears.

Referring to FIGURE 14, the possibility of another type of interfering reflection will be appreciated. Here again there is illustrated a freely rolling car 500 shown in full in its position on feeder track 502, the latter track communicating with branch tracks 504, 506, 508 and 510 by way of ladder track 512. It is assumed that car 500 is to be impacted against stationary car 514 on branch track 510. However, when car 500 is approaching switch point $S_1$ the radiation pattern 516 of its object detector is directed toward the stationary car 518 on branch track 504 and may continue to be so directed while within 60 feet of car 518 for a large number of transmitted pulses, but generally for only a fraction of a second, after which it will turn to the dotted position 520 so that its radiated pattern no longer embraces car 518. Similarly, when car 500 has approached curve C its antenna pattern may be directed toward an adjacent building or other structure 524 for a substantial fraction of a second before it turns onto branch track 510. In both of these cases, strong reflections may be received which will exceed the threshold level in the receiver for a sufficient number of successive transmitted pulses to initiate braking. However, the braking will be only momentary, since the strong reflections will not persist long enough to cause operation of the brake holding circuit 152, which only operates after the control signal generated by the memory integrator and threshold circuit 146 has persisted for a second. Accordingly, the rolling car may be slightly slowed by momentary braking at such points in its travel but, by starting the rolling car with a sufficient initial velocity, it will be able to reach its proper impacting position against stationary car 514 despite any such slight braking. As described previously, when the rolling car does approach within a predetermined distance of stationary car 514 the brake holding circuit 152 will be actuated so that sufficient time to brake the car to a gentle impact will be afforded.

While the invention has been described with particular reference to specific embodiments in the interest of definiteness, it will be understood that it may be embodied in a variety of diverse forms differing from those specifically described without departing from the invention as defined by the appended claims.

We claim:

1. An automatic braking system for railroad vehicles, comprising:
  pulse-reflection object detecting apparatus mountable on a first railroad vehicle for transmitting pulses of energy and for receiving reflection thereof from objects spaced from said first vehicle;
  circuit means responsive to said reflections to initiate brake control signals for braking said first vehicle; and
  means responsive to those of said reflections received from a second railroad vehicle during a predetermined relatively-earlier part of each interval between successive transmissions of said pulses for rendering said circuit means ineffective to initiate said brake control signals even if reflections are received in a later part of said interval, whereby automatic braking of said first railroad vehicle is prevented when said first railroad vehicle is adjacent said second vehicle in a train line.

2. The system of claim 1, comprising means responsive to reflections of said transmitted pulses from a railroad vehicle moving away from said first railroad vehicle for rendering said circuit means ineffective to initiate said brake control signals.

3. The system of claim 1, comprising means for rendering said circuit means ineffective to initiate said brake control signals in response to reflections of said transmitted pulses from a railroad vehicle spaced from said first railroad vehicle by a distance which is decreasing at less than a predetermined rate or is increasing.

4. An automatic braking system for railroad vehicles, comprising pulse-reflection object-detecting apparatus mountable on a first railroad vehicle for transmitting pulses and for receiving reflections thereof from other railroad vehicles on the same track, and circuit means responsive to said reflections for initiating braking of said first vehicle, wherein the improvement comprises:
  first means normally responsive to said reflections for supplying actuating signals to said circuit means to initiate braking, but capable of being rendered ineffective for this purpose by erase signals supplied thereto;
  second means, including gate circuit means, responsive to said reflections to produce erase signals when said gate circuit means is signal transmissive;
  means for rendering said gate circuit means transmissive of signals during a first interval following each of said transmitted pulses and non-transmissive during the remainder of each interval between successive ones of said transmitted pulses; and
  means for supplying said erase signals to said first means to render it ineffective to supply said actuating signals to said circuit means.

5. Apparatus for producing indications of the relative speed between a first vehicle and a second vehicle, comprising:
  means for transmitting pulses of energy from said first vehicle and for receiving reflections thereof from said second vehicle;
  means for deriving, from said received reflections, pulsiform signals having an amplitude varying with the range of said second vehicle from said first vehicle; and
  means for detecting the polarity of change in amplitude between successive ones of said pulsiform signals.

6. Apparatus in accordance with claim 5, in which said detecting means comprises capacitive means, unilaterally-conductive means connected to said capacitive means and supplied with said pulsiform signals for charging said capacitive means repetitively only when said amplitude is increasing, and means for detecting the occurrence of said repetitive charging of said capacitive means.

7. Apparatus in accordance with claim 5, comprising means for detecting the occurrence of rates of change in said amplitude in excess of a predetermined threshold rate.

8. Apparatus in accordance with claim 7, in which said last-named means comprises capacitive means, unilaterally-conductive means connected to said capacitive means and supplied with said pulsiform signals for charging said capacitor means when said unilaterally-conductive means is forward-biased, means for charging said capacitive means independently of said unilaterally-conductive means whereby said capacitive means is repetitively charged only when said amplitude of said pulsiform signals increases above the voltage produced on said capacitive means by said independently charging means, and means for detecting the occurrence of said repetitive charging by said pulsiform signals.

9. Apparatus in accordance with claim 7, in which said last-named means comprises capacitive means, unilaterally-conductive means connected to said capacitive means and supplied with said pulsiform signals for charging said capacitive means intermittently when said unilaterally-conductive means is forward-biased, and means connected to said capacitive means for producing repetitive output pulses only when the individual increases in voltage on said capacitive means produced by said intermittent chargings exceed a predetermined level.

10. An automatic braking control system for a vehicle comprising means on said vehicle for transmitting pulse signals and for receiving reflections of said pulse signals from a target object in the vicinity of said vehicle and means for braking said vehicle in response to received pulse reflections from said target object of more than a predetermined strength when the rate of closure between said vehicle and said object exceeds a predetermined rate; wherein said last-named means comprises:

means for initiating a sawtooth of voltage in response to each of said pulse reflections at a time when said each pulse reflection first attains a predetermined strength;

means for terminating each of said sawteeth of voltage a predetermined time after the occurrence of the immediately-preceding transmitted pulse signal, whereby the durations and maximum amplitudes of said sawteeth increase upon closure between said vehicle and said target object at a rate dependent upon said rate of closure and decrease in response to opening motion between said vehicle and said target object;

means responsive to said sawteeth of voltage for producing control signals upon the occurrence of rates of increase of said sawteeth in excess of a predetermined rate; and means for braking said vehicle in response to said control signals and for preventing the initiation of said braking at other times.

11. Automatic braking control means in accordance with claim 10, wherein said means for producing control signals comprises capacitive means, unilaterally-conductive means connected to said capacitive means for charging said capacitive means in response to said sawteeth only when the voltage of one of said sawteeth exceeds that on said capacitive means, and means for producing said control signals in response to the occurrence of repetitive charging of said capacitive means.

12. Apparatus for sensing the relative speed between a first object and a second object, comprising:

means for producing electrical pulses of sawtooth-like form having peak amplitudes substantially proportional to the distance between said first and second objects;

unilaterally-conductive means and capacitive means connected in series circuit with each other;

means for applying said electrical pulses across said series combination in a polarity to tend to render said unilaterally-conductive means conductive in response to the tips of said pulses and thereby to charge said capacitive means repetitively in stepwise fashion when said pulses are increasing in amplitude; and means for detecting the occurrence of repetitive charging of said capacitive means in response to said pulses.

13. The apparatus of claim 12, comprising means for charging said capacitive means at a predetermined rate by a path independent of said unilaterally-conductive means.

14. Apparatus for producing output signals indicative of changes in amplitude of input pulses thereto, comprising:

a transistor having emitter, collector and base electrodes;

a source of collector supply potential for said transistor;

a base-emitter circuit for said transistor comprising means for applying a bias between said emitter and base electrodes to maintain said transistor in a low-conduction state in the absence of said input pulses thereto and also comprising capacitive means supplied with charging current whenever said emitter electrode is forward biased with respect to said base electrode in response to said input pulses; and means for sensing charging of said capacitive means by said input pulses.

15. The apparatus of claim 14, in which said sensing means comprises an impedance connected between said collector electrode and said source of collector supply potential.

16. The apparatus of claim 14, in which said sensing means comprises thereshold means responsive to produce output signals only when the input voltage thereto exceeds a predetermined level and impedance means connected between said capacitive means and said threshold means for supplying said threshold means with pulses having amplitude proportional to the increments in voltage on said capacitive means due to said charging thereof, whereby said threshold means is operated only in response to a predetermined minimum increase in amplitude of said input pulses.

17. The apparatus of claim 14, comprising resistive means connected to said capacitive means and means for applying charging voltage to the end of said resistive means more remote from said capacitive means to charge said capacitive means independently of said transistor.

18. The apparatus of claim 17, wherein said charging voltage comprises pulses recurrent at the rate of recurrence of said input pulses.

19. The apparatus of claim 18, wherein said charging voltage comprises pulses having widths which increase as said capacitive means is charged further.

20. An automatic braking system for railroad vehicles, comprising:

pulse-reflection object detection apparatus mountable on a first railroad vehicle for transmitting pulses of energy and for receiving reflections thereof from objects spaced from said first vehicle.

brake control means responsive to actuating pulses supplied thereto to initiate brake control signals for braking said first vehicle;

sawtooth circuit means responsive to said pulse reflections for producing voltage pulses of substantially sawtooth form having a duration and hence an amplitude which increases with decreases in the time interval between transmission of a pulse and reception of the reflection thereof;

closing-speed sensor means supplied with said voltage pulses of substantially sawtooth form for producing repetitive output pulses only in response to those of said voltage pulses produced by reflections from a second railroad vehicle at a decreasing distance from said first vehicle;

integrating means for supplying said brake control means with said output pulses to produce brake control signals for initiating braking of said first vehicle only when said output pulses are produced in response to each of a plurality of immediately-successive transmitted pulses;

means selectively responsive to reflections received within a predetermined first part of the interval between successive transmitted pulses for producing erase signals;

means for applying said erase signals to said closing-speed sensor means to prevent output therefrom during said intervals in which said last-named reflections are received; and means responsive to the persistence of said brake control signals for a predetermined length of time greater than the time between successive transmitted pulses to maintain braking of said first vehicle even when said output pulses are no longer being produced.

21. A system in accordance with claim 20, in which said sawtooth circuit means comprises capacitive means and means for charging said capacitive means in response to those of said pulse reflections received after said predetermined first part of the intervals between successive transmitted pulses, and in which said means for applying said erase signals to said closing-speed sensor means comprises means for applying said erase signals to said capacitive means to discharge said capacitive means.

22. Apparatus in accordance with claim 21, in which said closing-speed sensor means is responsive to voltage pulses from said sawtooth circuit means which are of constant or decreasing amplitude to produce only a few initial output pulses in response to the first few of said voltage pulses of constant or decreasing amplitude, said system also comprising momentary-hold circuit means responsive to said erase signals to produce a gating voltage which persists momentarily after said erase signals are terminated and means for preventing application of said actuating pulses to said brake control means while said gating voltage persists.

References Cited

UNITED STATES PATENTS

| 1,166,278 | 1/1965 | Steinbach | 246—182 |
| 3,340,951 | 9/1967 | Vitt | 246—182 |
| 3,368,072 | 2/1968 | Baughman | 246—182 |
| 3,385,964 | 5/1968 | Clejan | 246—182 |

ARTHUR L. LA POINT, Primary Examiner

D. F. WORTH III, Assistant Examiner

U.S. Cl. X.R.

104—26

PO-1050
(5/69)

UNITED STATES PATENT OFFICE
CERTIFICATE OF CORRECTION

Patent No. 3,463,919               Dated August 26, 1969

Inventor(s) J. J. Da Rold et al

It is certified that error appears in the above-identified patent and that said Letters Patent are hereby corrected as shown below:

Column 2, line 4, "Foh" should read --For--
Column 3, line 6, "too" should read --to--; line 32, "objetcs" should read --objects--; line 44, "opeartive" should read --operative--; line 53, "miting" should read --mitting--; line 64, "smaller" should read --simila
Column 4, line 68, "persistted" should read --persisted--
Column 5, line 6, "sauce" should read --cause--; line 40, "correspoinding" should read --corresponding--
Column 6, line 51, "latter" should read --later--
Column 7, line 50, "feder" should read --feeder--
Column 8, line 57, "DCC" should read --DC--; line 59, "carr" should read --car--
Column 11, line 58, "2" should read --5--; line 60, before "trans-" insert --threshold level are the desired pulses $\underline{w}$ and the--
Column 13, line 60, "actutaed" should read --actuated--
Column 16, line 33, "is" should read --if--
Column 17, line 7, before "about" insert --ground and B+ and the output of the multivibrator is at--
Column 22, line 1, "supply" should read --apply--

SIGNED AND
SEALED
MAY 12 1970

(SEAL)
Attest:

Edward M. Fletcher, Jr.
Attesting Officer

WILLIAM E. SCHUYLER, JR.
Commissioner of Patents